(12) United States Patent
Masuda

(10) Patent No.: US 11,314,464 B2
(45) Date of Patent: Apr. 26, 2022

(54) INFORMATION PROCESSING APPARATUS WITH PRINT CONTROL FEATURE, PRINT SERVER, PRINTING SYSTEM, AND RECORDING MEDIUM

(71) Applicant: KONICA MINOLTA, INC., Tokyo (JP)

(72) Inventor: Tetsuya Masuda, Nishinomiya (JP)

(73) Assignee: KONICA MINOLTA, INC., Tokyo (JP)

( * ) Notice: Subject to any disclaimer, the term of this patent is extended or adjusted under 35 U.S.C. 154(b) by 69 days.

(21) Appl. No.: 16/843,588

(22) Filed: Apr. 8, 2020

(65) Prior Publication Data
US 2020/0341698 A1 Oct. 29, 2020

(30) Foreign Application Priority Data
Apr. 24, 2019 (JP) ............................... JP2019-082797

(51) Int. Cl.
*G06F 3/12* (2006.01)
(52) U.S. Cl.
CPC .......... *G06F 3/1205* (2013.01); *G06F 3/1238* (2013.01); *G06F 3/1258* (2013.01); *G06F 3/1286* (2013.01)
(58) Field of Classification Search
None
See application file for complete search history.

(56) References Cited

U.S. PATENT DOCUMENTS

| 2016/0299728 | A1* | 10/2016 | Li | G06F 3/1292 |
| 2018/0011668 | A1* | 1/2018 | Chai | G06F 3/1254 |
| 2019/0114125 | A1* | 4/2019 | Imai | G06F 3/1257 |

FOREIGN PATENT DOCUMENTS

| JP | 2012177969 A | 9/2012 |
| JP | 2012190057 A | * 10/2012 |
| JP | 2018001468 A | 1/2018 |

* cited by examiner

*Primary Examiner* — Thomas D Lee
(74) *Attorney, Agent, or Firm* — Buchanan Ingersoll & Rooney PC

(57) ABSTRACT

An information processing apparatus includes a processor that performs: after a user starts to configure settings for printing, making a first judgment on whether or not a printing apparatus specified for printing is a printer model supported by print setting software installed on the information processing apparatus; making a second judgment on whether or not switching to a machine-independent print control method is necessary, with reference to the first judgment; and if switching to a machine-independent print control method is necessary, performing: switching to the machine-independent print control method; generating a print job by the machine-independent print control method; and transmitting the print job to the specified printing apparatus.

40 Claims, 16 Drawing Sheets

INFORMATION PROCESSING APPARATUS WITH PRINT CONTROL FEATURE, PRINT SERVER, PRINTING SYSTEM, AND RECORDING MEDIUM

The disclosure of Japanese Patent Application No. 2019-082797 filed on Apr. 24, 2019, including description, claims, drawings, and abstract, is incorporated herein by reference in its entirety.

BACKGROUND

Technological Field

The present invention relates to: an information processing apparatus that allows the user to start printing and transmit a print job to a printing apparatus; a print server that receives the print job from the information processing apparatus and transfers it to the printing apparatus; a printing system provided with the information processing apparatus and the print server; and a recording medium.

Description of the Related Art

To make a printing apparatus perform printing from an information processing apparatus such as a personal computer, the user enters a document ID, a username, and other information and transmits a command requesting to run a print job (for example, a PJL command) to the printing apparatus, using a print setting screen of printer settings software installed on the information processing apparatus, such as a printer driver.

Even upon receiving a command from the information processing apparatus, the printing apparatus specified for printing is not allowed to perform printing when it is not a printer model supported by the printer driver installed on the information processing apparatus.

To print a confidential document securely, there is a print method that allows the user to use authentication information. In this method, the user gives a document a password as authentication information and transmits a print job to the printing apparatus. The user then enters that password via the operation panel of the printing apparatus to make it print the document. There is another printing method that allows the user to enter his/her username and password on record for user authentication.

In this method, the information processing apparatus encrypts a password and the like since they are secret information, and transmits the encrypted information to the printing apparatus. The printing apparatus then performs decryption and printing.

The printing apparatus by default stores a cryptographic key used for encryption, which is a different value depending on the printer model. So, the printing apparatus is not allowed to confirm the entered authentication information for printing when it is not a printer model supported by the printer driver installed on the information processing apparatus. To solve this problem, the user needs to learn the printer models supported by the printer driver and specify another printing apparatus, which makes printing experiences less user-friendly.

Japanese Unexamined Patent Application Publication No. 2012-177969 discloses a technique for a pull-printing system to perform secure printing even when a print server is not in operation. Specifically, when a print server apparatus is confirmed to be in operation, a print requesting apparatus transmits print data to the print server apparatus; when it is not confirmed to be in operation, the print requesting apparatus transfers print data to a printer apparatus instead of the print server apparatus. In response to a request from the printer apparatus, the print server apparatus transfers the print data to the printer apparatus. Upon success of user authentication, the printer apparatus performs printing on the basis of the print data received from the print requesting apparatus or from the print server apparatus.

Japanese Unexamined Patent Application Publication No. 2018-001468 discloses a printing system that is capable of changing cryptographic keys of printer drivers installed on multiple printers whose models are the same and a printer driver installed on a server, to any value specified by the user. Specifically, upon entry of a new cryptographic key by the user, a master printer generates new cryptographic key information by encrypting the new cryptographic key using its own default cryptographic key. The master printer then transfers the new cryptographic key information to an identical printer whose model is the same as that of the master printer itself, which is detected by searching the network. The master printer transfers apparatus information identifying the detected printer, to a printer driver installed on a server. Receiving the new cryptographic key information, the detected printer, whose model is the same as that of the master printer, decrypts it using its own default cryptographic key and updates its own default cryptographic key with the new cryptographic key. The printer driver installed on the server receives the apparatus information. Upon entry of a new cryptographic key by the user, the printer driver installed on the server updates its own cryptographic key with the new cryptographic key, which will be used for encryption of a print job to be transferred to the printer identified by the apparatus information.

The techniques described in Japanese Unexamined Patent Application Publications No. 2012-177969 and No. 2018-001468 are not based on the case where the printing apparatus specified for printing is not a printer model supported by the printer driver installed on the information processing apparatus.

So, these techniques do not bring a solution to the problem that, even upon receiving a command from the information processing apparatus, the printing apparatus specified for printing is not allowed to perform printing when it is not a printer model supported by the printer driver installed on the information processing apparatus.

SUMMARY

The present invention, which has been made in consideration of such a technical background as described above, is aimed at providing: an information processing apparatus; a print server; a printing system; and a recording medium, which allow the user to make a printing apparatus perform printing without concern for technical compatibility even when a printing apparatus specified for printing is not a printer model supported by printer settings software installed on the information processing apparatus, such as a printer driver.

A first aspect of the present invention relates to an information processing apparatus including a processor that performs:

after a user starts to configure settings for printing, making a first judgment on whether or not a printing apparatus specified for printing is a printer model supported by print setting software installed on the information processing apparatus;

making a second judgment on whether or not switching to a machine-independent print control method is necessary, with reference to the first judgment; and if switching to a machine-independent print control method is necessary, performing: switching to the machine-independent print control method; generating a first print job by the machine-independent print control method; and transmitting the first print job to the specified printing apparatus.

A second aspect of the present invention relates to a print server to receive a first print job from one or more information processing apparatuses and transfer the first print job to a printing apparatus specified for printing, the print server including a processor that performs:

after a user starts to configure settings for printing, making a first judgment on whether or not the specified printing apparatus is a printer model supported by print setting software installed on the information processing apparatus;

making a second judgment on whether or not switching to a machine-independent print control method is necessary, with reference to the first judgment; and if switching to a machine-independent print control method is necessary, performing: switching to the machine-independent print control method; generating a second print job by the machine-independent print control method; and transmitting the second print job to the specified printing apparatus.

A third aspect of the present invention relates to a non-transitory computer-readable recording medium storing a program for a computer of an information processing apparatus to execute:

after a user starts to configure settings for printing, making a first judgment on whether or not a printing apparatus specified for printing is a printer model supported by print setting software installed on the computer;

making a second judgment on whether or not switching to a machine-independent print control method is necessary, with reference to the first judgment; and if switching to a machine-independent print control method is necessary, performing: switching to the machine-independent print control method; generating a print job by the machine-independent print control method; and transmitting the print job to the specified printing apparatus.

A fourth aspect of the present invention relates to a non-transitory computer-readable recording medium storing a program for a computer of a print server, the print server to receive a first print job from one or more information processing apparatuses and transfer the first print job to a printing apparatus specified for printing, the program for the computer to execute:

after a user starts to configure settings for printing, making a first judgment on whether or not the specified printing apparatus is a printer model supported by print setting software installed on the computer;

making a second judgment on whether or not switching to a machine-independent print control method is necessary, with reference to the first judgment; and if switching to a machine-independent print control method is necessary, performing: switching to the machine-independent print control method; generating a second print job by the machine-independent print control method; and transmitting the second print job to the specified printing apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
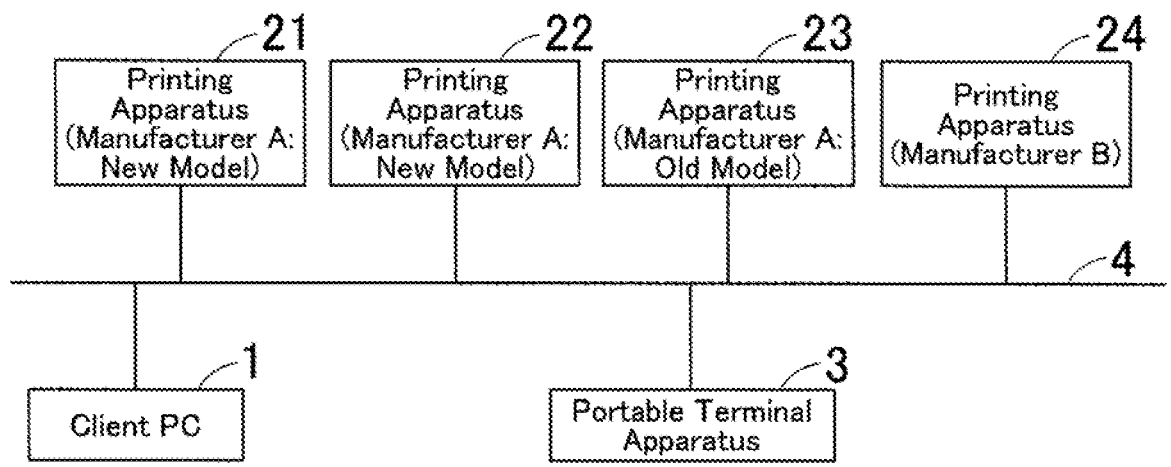
FIG. 1 is a block diagram illustrating a configuration of a printing system according to a first embodiment of the present invention.

FIG. 1 is a block diagram illustrating a configuration of a printing system according to one embodiment of the present invention. The printing system includes an information processing apparatus 1, multiple printing apparatuses 21 to 24, and a portable terminal apparatus 3, which are connected to each other through a network 4.

The information processing apparatus 1 is comprised of a personal computer. Hereinafter, the information processing apparatus 1 will be referred to as "client PC 1" as well. The printing apparatuses 21 to 24 are different printer models from each other. In this embodiment, the printing apparatuses 21 and 22 are new printer models from Manufacture A, the printing apparatus 23 is an old printer model from Manufacturer A, and the printing apparatus 24 is a printer model from Manufacturer B. Manufacturer A is the same manufacturer as that of a printer driver installed on the client PC 1; the printer driver will be described later.

The portable terminal apparatus 3 is a portable electrical information appliance such as a smartphone or a tablet computer, which is capable of perform communications with the client PC 1 and other apparatuses through the network 4.

Figure 2:
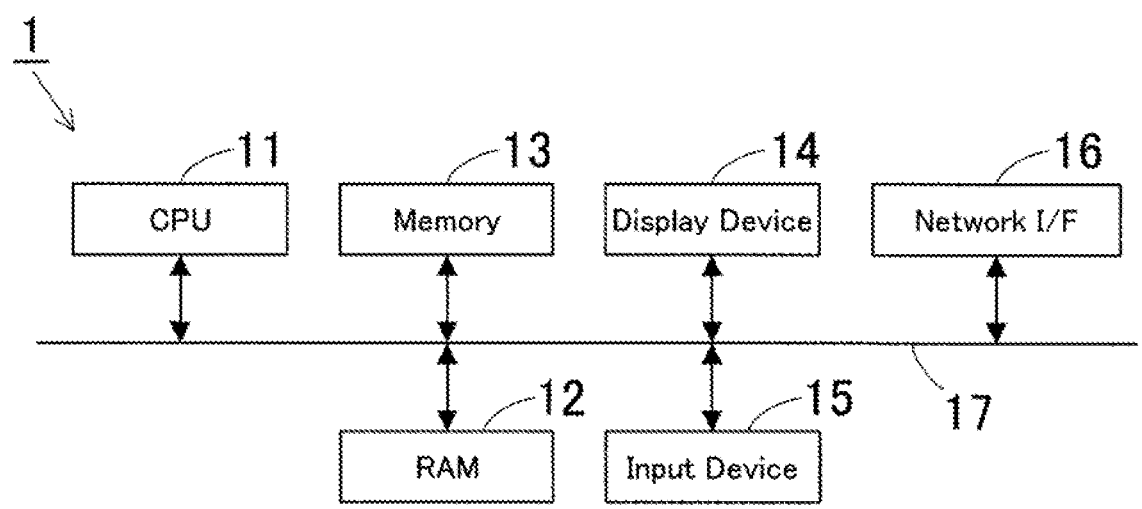
FIG. 2 is a block diagram illustrating a comprehensive configuration of an information processing apparatus.

FIG. 2 is a block diagram illustrating a comprehensive configuration of the client PC 10. As illustrated in FIG. 2, the client PC 1 is essentially provided with a CPU 11, a RAM 12, a memory 13, a display device 14, an input device 15, and a network interface (network I/F) 16, all of which are connected to each other through a system bus 17.

The CPU 11 controls the client PC 1 in a unified and systematic manner by executing programs stored on a recording medium such as the memory 13. Specifically, in this embodiment, the CPU 11 issues a command for printing by transmitting a print job to the printing apparatuses 21 to 24, which are output apparatuses.

The RAM 12 is a recording medium that provides a work area for the CPU 11 to perform processing in accordance with operation programs.

The memory 13 is a recording medium comprised of a hard disk drive, for example; it essentially stores various types of data for management, an operating system (OS), and application programs including a printer driver.

The display device 14 is comprised of a liquid-crystal display, for example; it essentially displays various messages, entry screens, and option selecting screens for the user.

The input device 550 serves for the user to make entries; it is essentially comprised of a keyboard and a mouse.

The network interface 16 serves as a transceiver that exchanges data with external apparatuses such as the printing apparatuses 21 to 24 through the network 4.

Figure 3:
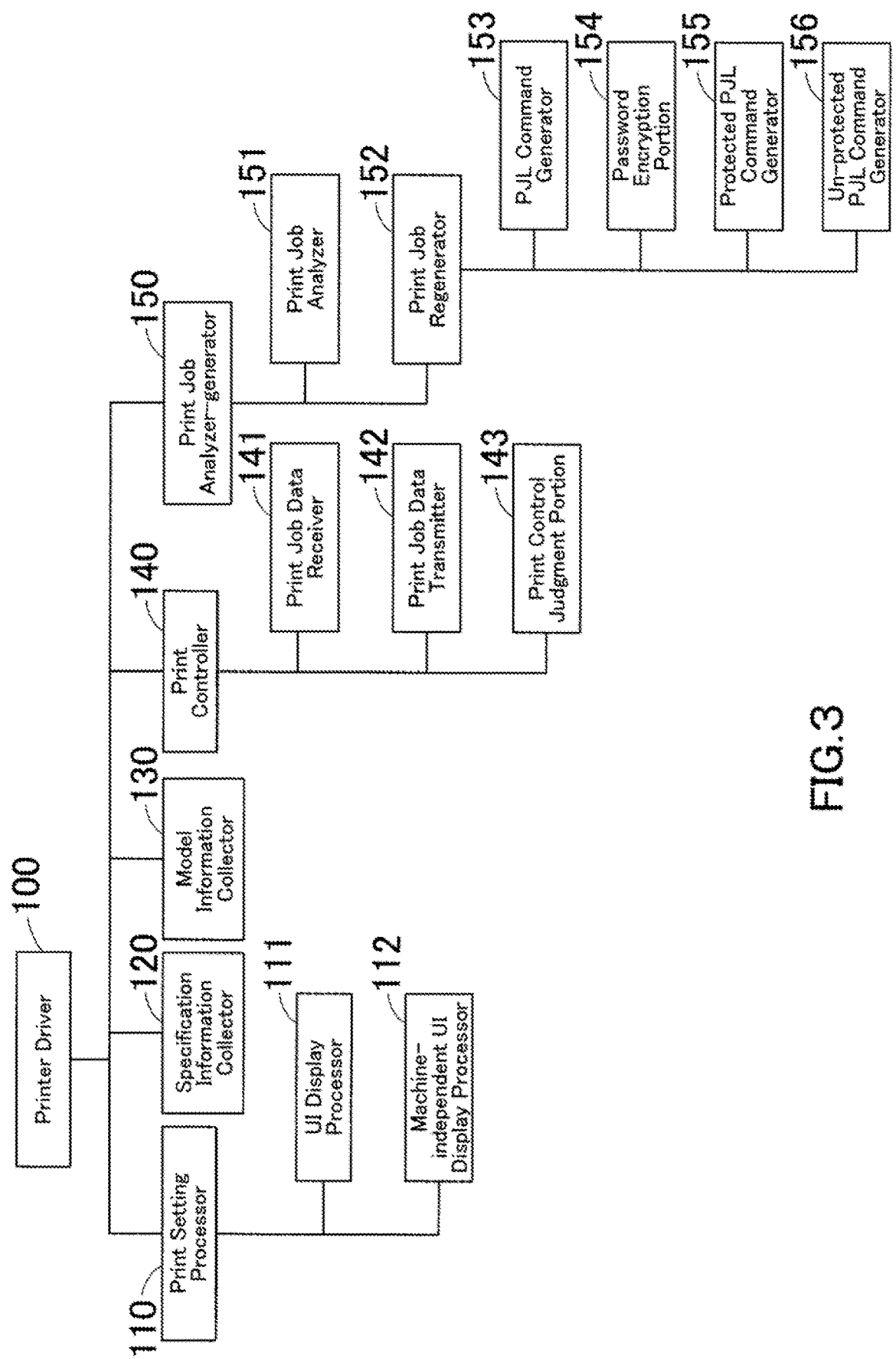
FIG. 3 is a block diagram illustrating a functional configuration of a CPU of the information processing apparatus, in which the CPU executes functions by running a printer driver.

FIG. 3 is a block diagram illustrating a functional configuration of the CPU 11, in which the CPU 11 executes functions by running a printer driver 100.

The printer driver 100 is constituted by: a print setting processor 110; a specification information collector 120; a model information collector 130; a print controller 140; and a print job analyzer-generator 150.

The print setting processor 110 receives entries by the user for printing, performs a process related to settings of a print job, displays a print setting screen, and receives entries from the print setting screen. The print setting processor 110 is provided with: an UI display processor 111 that displays a print setting screen by running the printer driver 100; and a machine-independent UI display processor 112 that displays a print setting screen by a machine-independent print control method such as an internet printing protocol (IPP) printing method.

The specification information collector 120 collects specification information of one or more of the printing apparatuses 21 to 24 through the network 4. Specification information of the printing apparatuses 21 to 24 is, for example, available paper trays, the size of paper in each paper tray, available functions for printing, and the presence or absence of an optional device such as a finisher.

The model information collector 130 collects model information of one or more of the printing apparatuses 21 to 24; model information is manufacturer, brand, and version, for example.

The print controller 140 controls transmission and receipt of data of a print job and makes judgments about print control. The print controller 140 is provided with: a print job data receiver 141 that receives data of a print job from an external apparatus such as the portable terminal apparatus 3; a print job data transmitter 142 that transmits data of the print job to a printing apparatus specified for printing; and a print control judgment portion 143. With reference to the model information of the printing apparatuses 21 to 24, which is obtained by the model information collector 130, the print control judgment portion 143 judges whether or not the printing apparatuses 21 to 24 are printer models supported by the printer driver 100 and whether or not they are printer models from the same manufacturer as that of the printer driver 100, which are similar to the printer model supported by the printer driver 100. If they are not printer models supported by the printer driver 100, the print control judgment portion 143 further judges whether or not switching to a machine-independent print control method is necessary. If it is necessary, the print control judgment portion 143 switches to an IPP printing method as mentioned above, for example.

The print job analyzer-generator 150 analyzes data of a print job, and generates and regenerates data of a print job; it essentially has a print job analyzer 151 that performs analysis and a print job regenerator 152. The print job regenerator 152 generates and regenerates data of a print job; it is essentially provided with: a PJL command generator 153 that generates a PJL command; a password encryption portion 154 that encrypts a password with a cryptographic key; a protected PJL command generator 155 that generates a PJL command protected by the encrypted password; and a unprotected PJL command generator 156 that generates a unprotected PJL command.

Figure 4A:
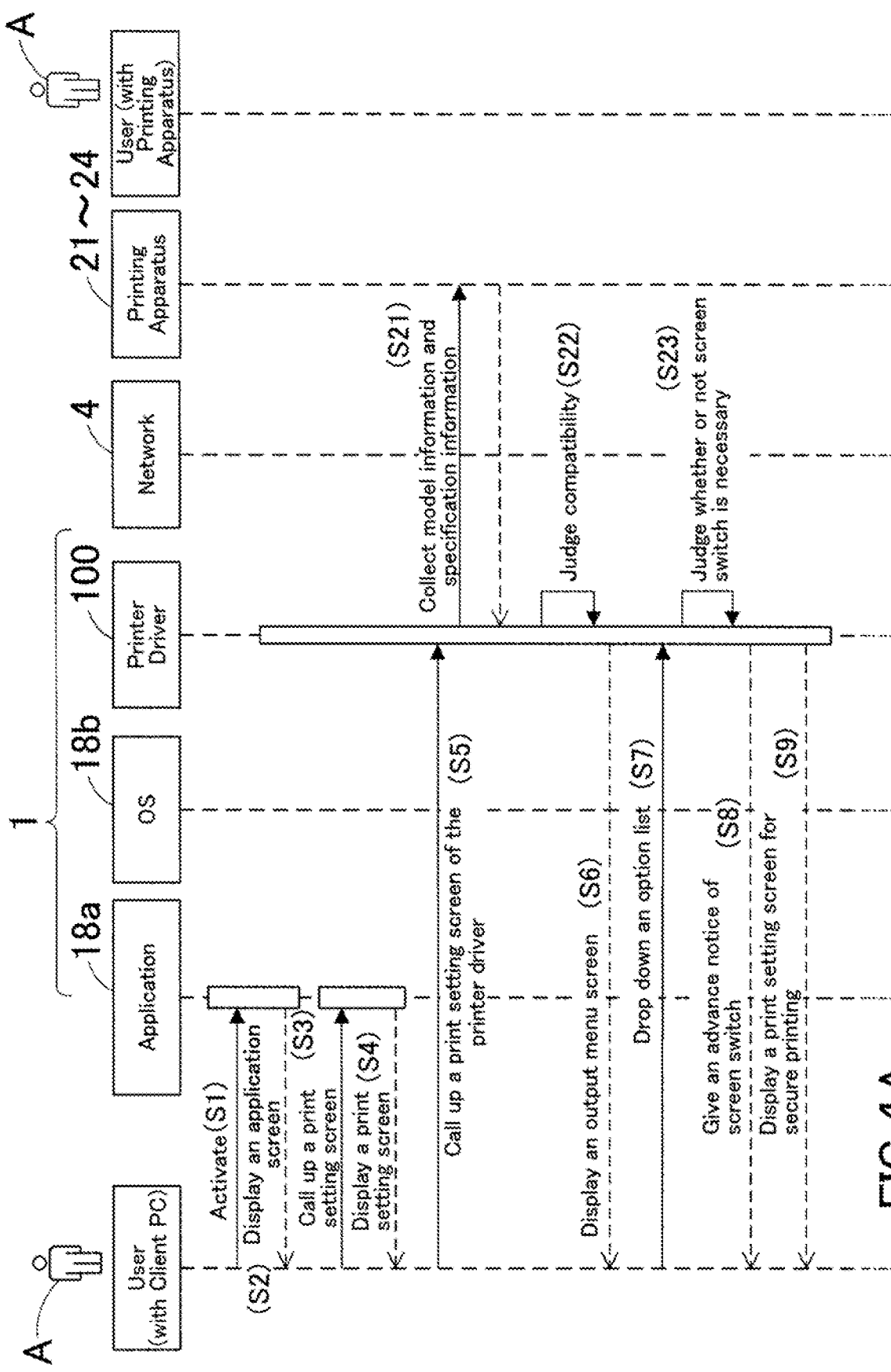
FIG. 4A is a sequence diagram for reference in describing an operation to be performed by a client PC 1 of the printing system of FIG. 1.
Figure 4B:
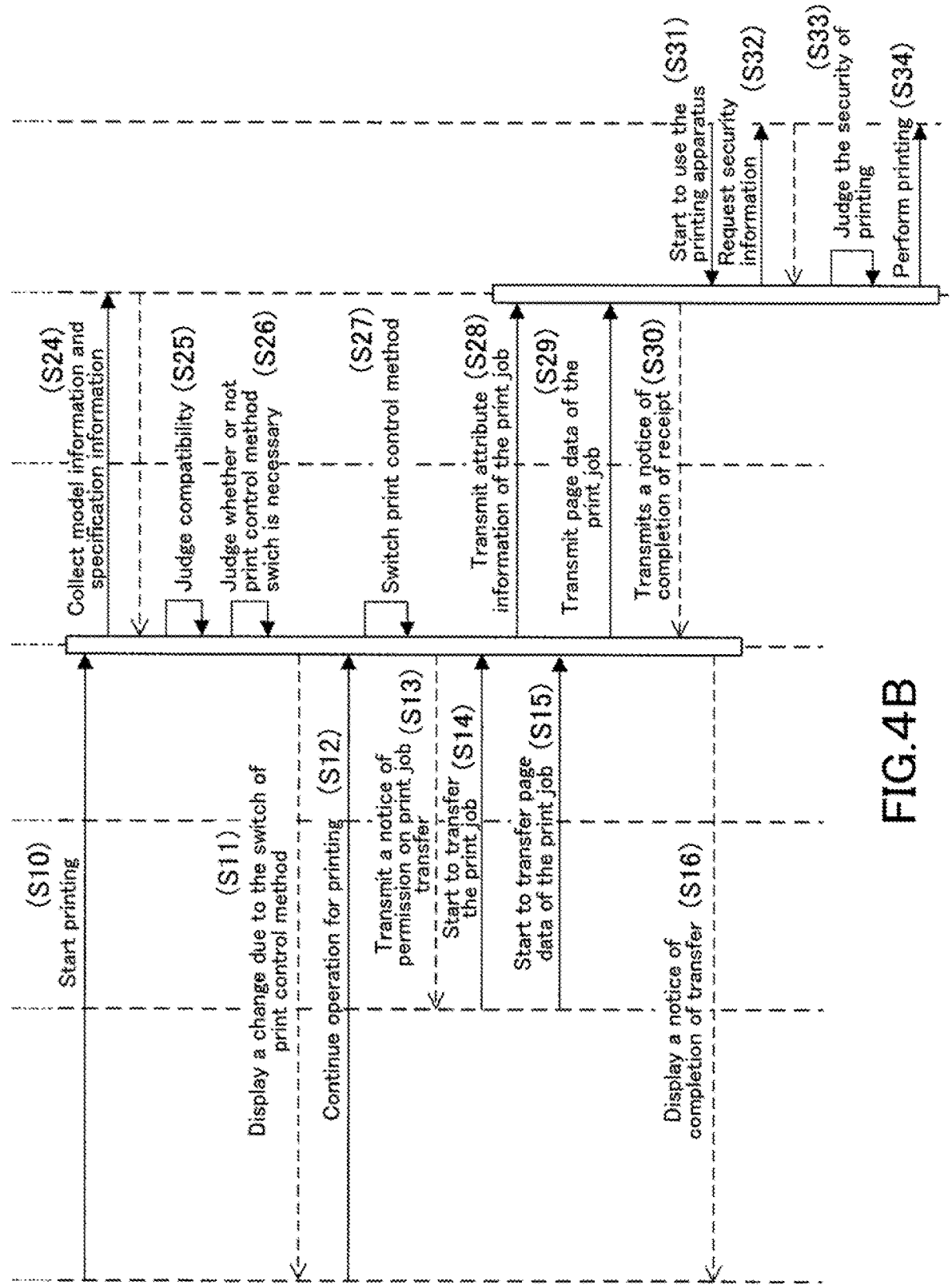
FIG. 4B is a sequence diagram continued from FIG. 4A.

FIG. 4A is a sequence diagram for reference in describing an operation to be performed by the client PC 1 of the printing system of FIG. 1, and FIG. 4B is a sequence diagram continued therefrom.

Referring to FIG. 4A, an application 18a is application software for document creating and editing, for example, installed on the client PC 1. An OS 18b is an operating system of the client PC 1. These are stored on a recording medium such as the memory 13 along with the printer driver 100 mentioned above.

In this embodiment, the printing apparatus 21 is a printer model supported by the printer driver 100 since it is a new printer model from the same manufacturer as that of the printer driver 100. The printing apparatus 24 is a printer model not supported by the printer driver 100 since it is a printer model from another manufacturer. Here, the user is intending to make the printing apparatus 24, which is a printer model from another manufacturer, perform printing.

User A activates the application 18*a* using the input device 15 of the client PC 1 (Step S1); the application 18*a* displays an application screen on the display device 14 (Step S2). To start settings for printing, User A calls up a print setting screen from the application screen (Step S3). The application 18*a* then displays a print setting screen (Step S4). User A thus can start print settings using the screen.

User A specifies the printing apparatus 24 via the print setting screen. To perform top-secret printing, private printing, and another print operation using authentication information such as a password or a PIN code (hereinafter referred to as secure printing as well), User A further calls up a print setting screen of the printer driver 100 (Step S5). The printer driver 100 then obtains model information and specification information of the printing apparatus 24 specified by the user, through the network 4 (Step S21). In this embodiment and the following embodiments, secure printing includes encrypting and decrypting print data or the like with authentication information or a cryptographic key.

With reference to the model information, the printer driver 100 judges whether or not the printing apparatus 24 is a printer model supported by the printer driver 100 itself (Step S22). At the same time, the printer driver 100 displays an output menu screen D1 as illustrated in FIG. 5A on the display device 14 (Step S6).

Figure 5A:
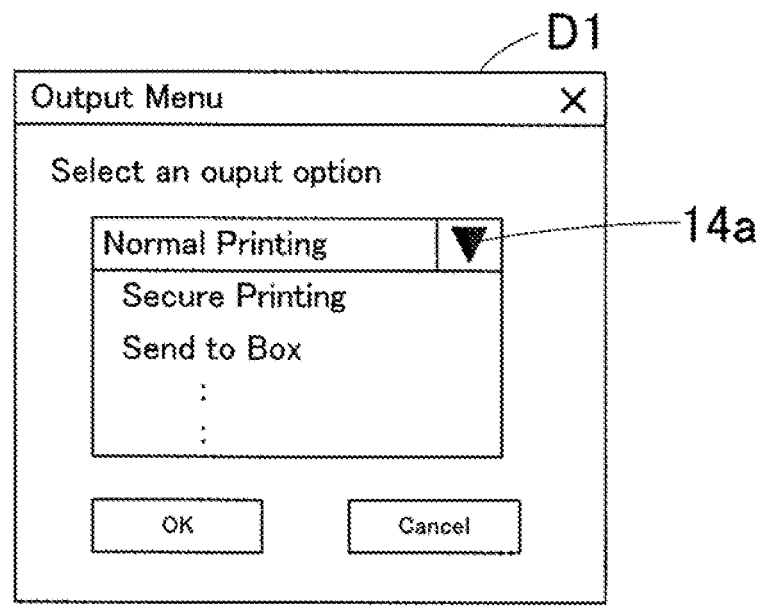
FIG. 5A illustrates an output menu screen for the user to specify an output option.
Figure 5B:
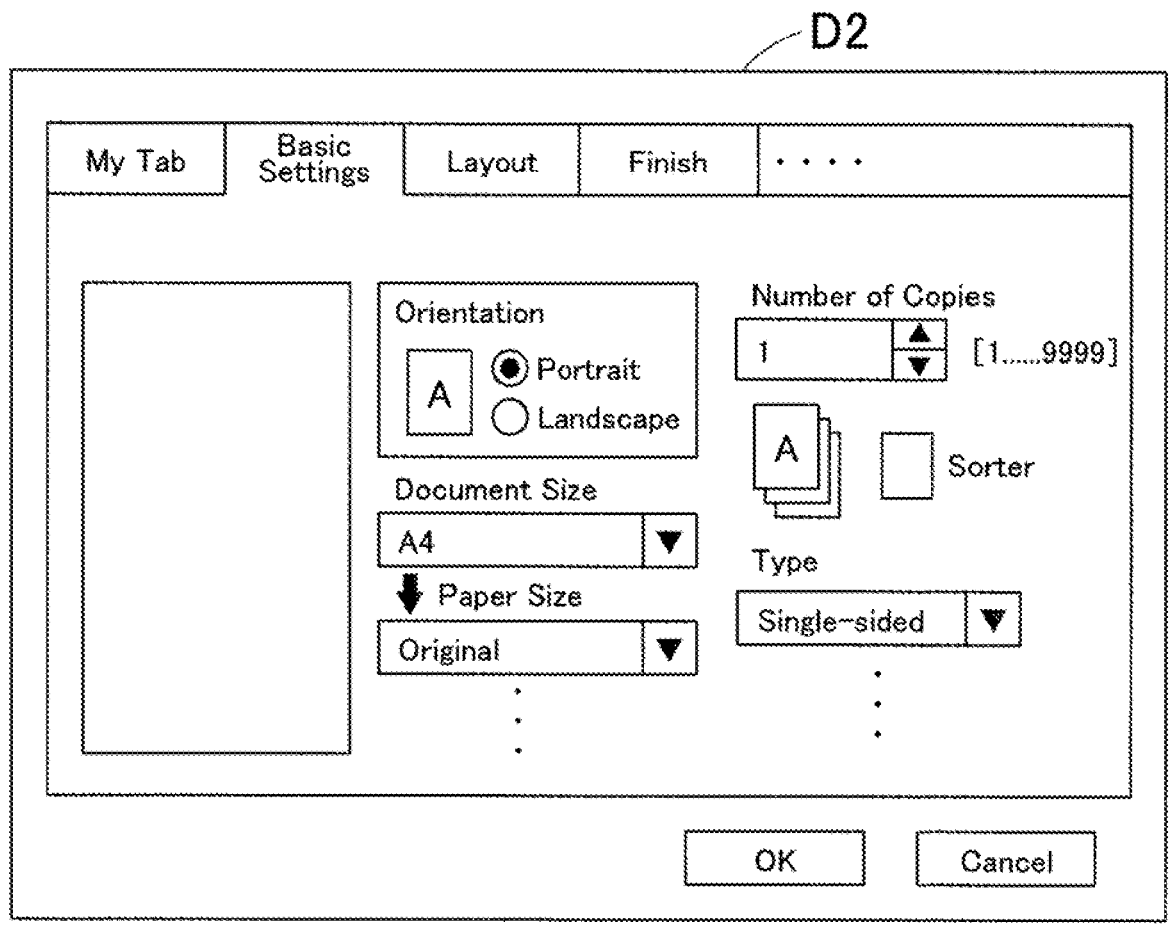
FIG. 5B illustrates a print setting screen to appear when normal printing is selected in the output menu screen of FIG. 5A.

When User A selects "normal printing" in the output menu screen D1 of FIG. 5A, the printer driver 100 will display a print setting screen D2 as illustrated in FIG. 5B on the display device 14.

Figure 6A:
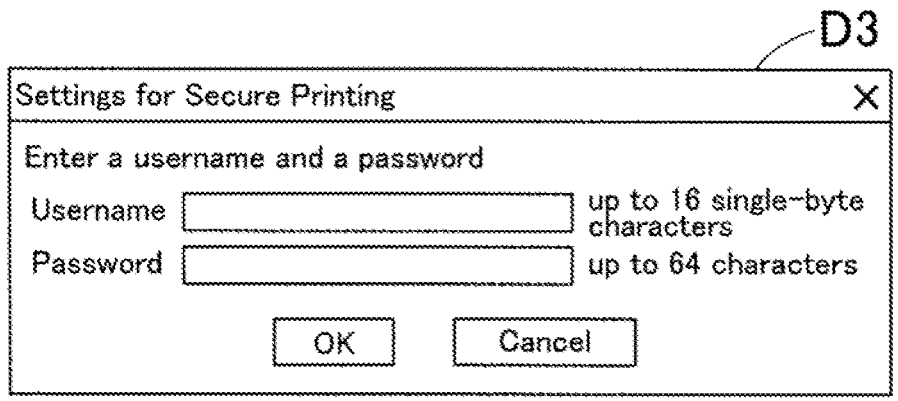
FIG. 6A illustrates a print setting screen to appear when a print option using authentication information such as a password (secure printing) is selected in the output menu screen of FIG. 5A and switching to a machine-independent print control method is not necessary.

User A drops down a drop-down list by clicking on a menu button 14*a* in the output menu screen D1 and selects "secure printing" from the list (Step S7). As security printing is thus requested by the user, the printer driver 100 judges whether or not the print setting screen for secure printing needs to be switched (Step S23) with reference to a judgment in Step S22 on whether or not the printing apparatus 24 is a printer model supported by the printer driver 100 itself. If it is a printer model supported by the printer driver 100 and the print setting screen for secure printing does not need to be switched, the printer driver 100 then displays a print setting screen D3 as illustrated in FIG. 6A.

In this embodiment, the printing apparatus 24 specified by the user is not a printer model supported by the printer driver 100 since it is a printer model from another manufacturer. This means, the printing apparatus 24 uses a different cryptographic key for secure printing from that of the printer driver 100. Upon judging that it is not a printer model supported by the printer driver 100, the printer driver 100 judges that the print setting screen for secure printing needs to be switched to a machine-independent version such as an IPP version. Subsequently, the printer driver 100 displays a message or icon on the client PC 1, allowing User A to notice that the print setting screen for secure printing will be switched to an IPP version (Step S8) and then displays an IPP version of the print setting screen on the display device 14 (Step S9). Such a message or icon may appear in the print setting screen; alternatively, it may appear on the portable terminal apparatus 3 carried by User A.

Figure 6B:
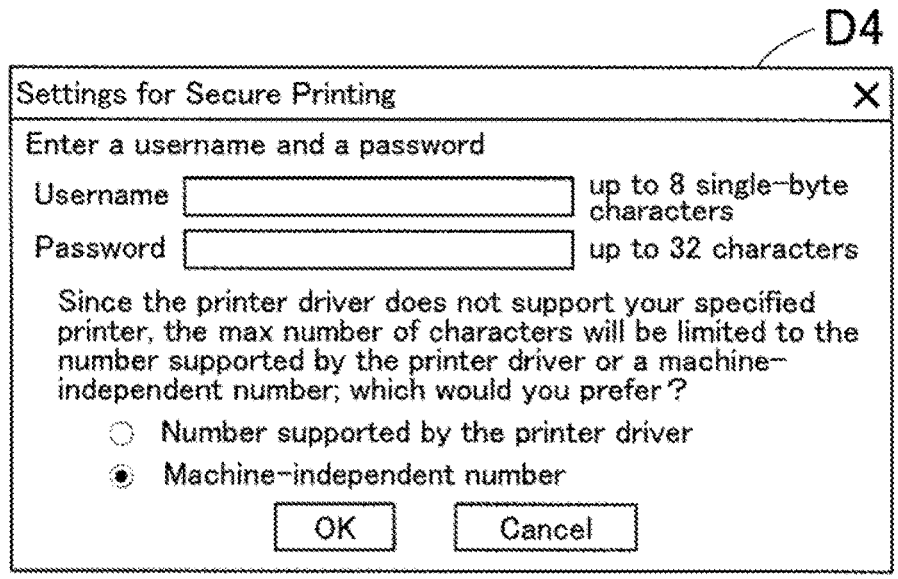
FIG. 6B illustrates a print setting screen to appear when a print option using authentication information such as a password (secure printing) is selected in the output menu screen of FIG. 5A and switching to a machine-independent print control method is necessary.
Figure 6C:
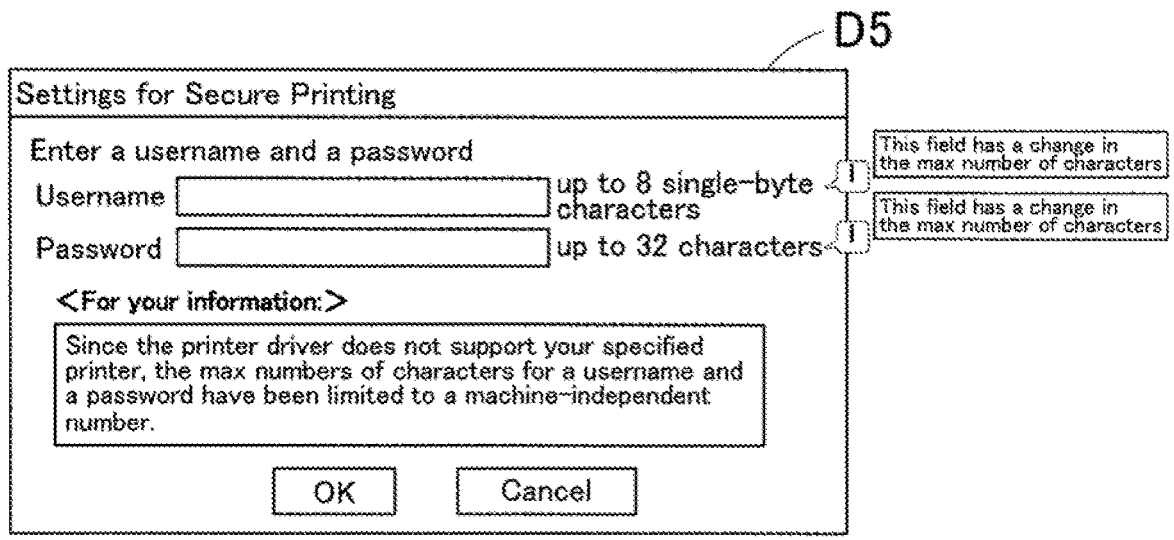
FIG. 6C illustrates the print setting screen of FIG. 6B, with the addition of information allowing the user to notice a change due to the switch.

FIG. 6B illustrates a print setting screen D4 for secure printing, as an example. In this example, a username and a password will be entered. When there is a change due to the switch, it is preferable that such a change be indicated in the print setting screen. For example, when the number of characters for a username or password is further limited, it is preferable to allow the user to notice the change via a print setting screen as illustrated in FIG. 6C. The number of characters for a username is limited to 16 maximum in the print setting screen D3 of FIG. 6A, but is further limited to 8 maximum in the print setting screen D4 of FIG. 6B; the number of characters for a password is limited to 64 maximum in the print setting screen D3, but is further limited to 32 maximum in the print setting screen D4. The change in the number of characters for a username and a password are indicated in the print setting screen D5 of FIG. 6C. After entry of a password and the like, a cancel button may be pressed; in this case, the entry is canceled and the previous screen comes back. Alternatively, a cancel button may be pressed; in this case, the entry is confirmed.

Upon confirmation of identification information entered, an IPP version of the print setting screen may appear or a print job for IPP printing may be generated. In either of the cases, print settings will migrate from print functions supported by the printer driver 100 to the corresponding print functions supported by the machine-independent print control method.

Furthermore, the printer driver 100 may process the print data to make it fit to print specifications of the printing apparatus 24, with reference to the specification information of the printing apparatus 24, which is obtained in Step S21. For example, the printer driver 100 may downgrade the image quality depending on the resolution of the printing apparatus 24; the printer driver 100 may convert the print data into a file format supported on the printing apparatus 24 when the file format specified by the user is unsupported on the printing apparatus 24.

Back to FIG. 4B, upon the start of printing by User A (Step S10), the printer driver 100 again obtains model information and specification information of the printing apparatus 24 through the network 4 (Step S24).

With reference to the model information, the printer driver 100 judges whether or not printing apparatus 24 is a printer model supported by the printer driver 100 itself (Step S25); with reference to a judgment in Step S25, the printer driver 100 further judges whether or not switching the print control method is necessary (Step S26).

The printing apparatus 24 is not a printer model supported by the printer driver 100 since it is a printer model from another manufacturer. Upon judging that it is not a printer model supported by the printer driver 100, the printer driver 100 judges that switching to an IPP printing method, a machine-independent print control method is necessary. Subsequently, the printer driver 100 displays a message or icon on the display device 14 or the portable terminal apparatus 3, allowing User A to notice a change due to the switch (Step S11).

The change due to the switch relates to, for example, at least one of: (i) a downgraded image quality due to the change of image format; (ii) a print function unsupported by a machine-independent print control method; and (iii) a print function unsupported on the specified printing apparatus. With this message or icon, User A can easily notice the change.

User A may reconfigure the settings affected by the change. User A may reconfigure the print settings from the portable terminal apparatus 3; in this case, the portable terminal apparatus 3 transmits a request for print settings change to the client PC 1 and the client PC 1 receives such a request. Furthermore, User A may change his/her password on record.

User A continues his/her operation for printing (Step S12). The printer driver 100 switches to an IPP printing method, a machine-independent print control method (Step S27) and transmits, to the application 18a, a notice of permission on print job transfer (Step S13). In response to the notice, the application 18a starts to transfer the print job (Step S14). The printer driver 100 transmits attribute information of the print job to the printing apparatus 24 by an IPP printing method (Step S28).

The application 18a further starts to transfer page data of the print job (Step S15). The printer driver 100 transfers the page data of the print job to the printing apparatus 24 (Step S29). Receiving the data of the print job, the printing apparatus 24 stores it in a memory area referred to as a "box", for example.

Upon completion of print job receipt, the printing apparatus 24 transmits a notice of completion of print job receipt to the printer driver 100 (Step S30). Upon receipt of this, the printer driver 100 displays a message or icon on the display device 14 of the client PC 1 or on the portable terminal apparatus 3, allowing User A to notice the completion of print job transfer (Step S16).

After that, User A comes to the printing apparatus 24 and starts to use it for printing (Step S31). The printing apparatus 24 requests to enter security information (authentication information) (Step S32). Upon entry of security information by User A, the printing apparatus 24 judges whether or not the entered security information is the same as the encrypted security information included in the print job (Step S33). If it is the same, the printing apparatus 24 performs printing (Step S34).

As described above, in this embodiment, while User A performs print settings after print start, it is judged whether or not the printing apparatus 24 specified for printing is a printer model supported by the printer driver 100 installed on the client PC 1. If it is not a printer model supported by the printer driver 100, the print control method is switched to a machine-independent print control method such as an IPP printing method. Encryption is performed on the password and the like with a cryptographic key for IPP printing and the print job is transferred to the printing apparatus 24 specified for printing. So, User A can make the printing apparatus 24 perform secure printing successfully from the client PC 1 without concern for the compatibility between the printing apparatus 24 and the printer driver 100. Furthermore, User A does not need to install on the client PC 1 multiple printer drivers that support the printing apparatus 21 to 24, which would make printing experiences user-friendly.

Second Embodiment

Figure 7:
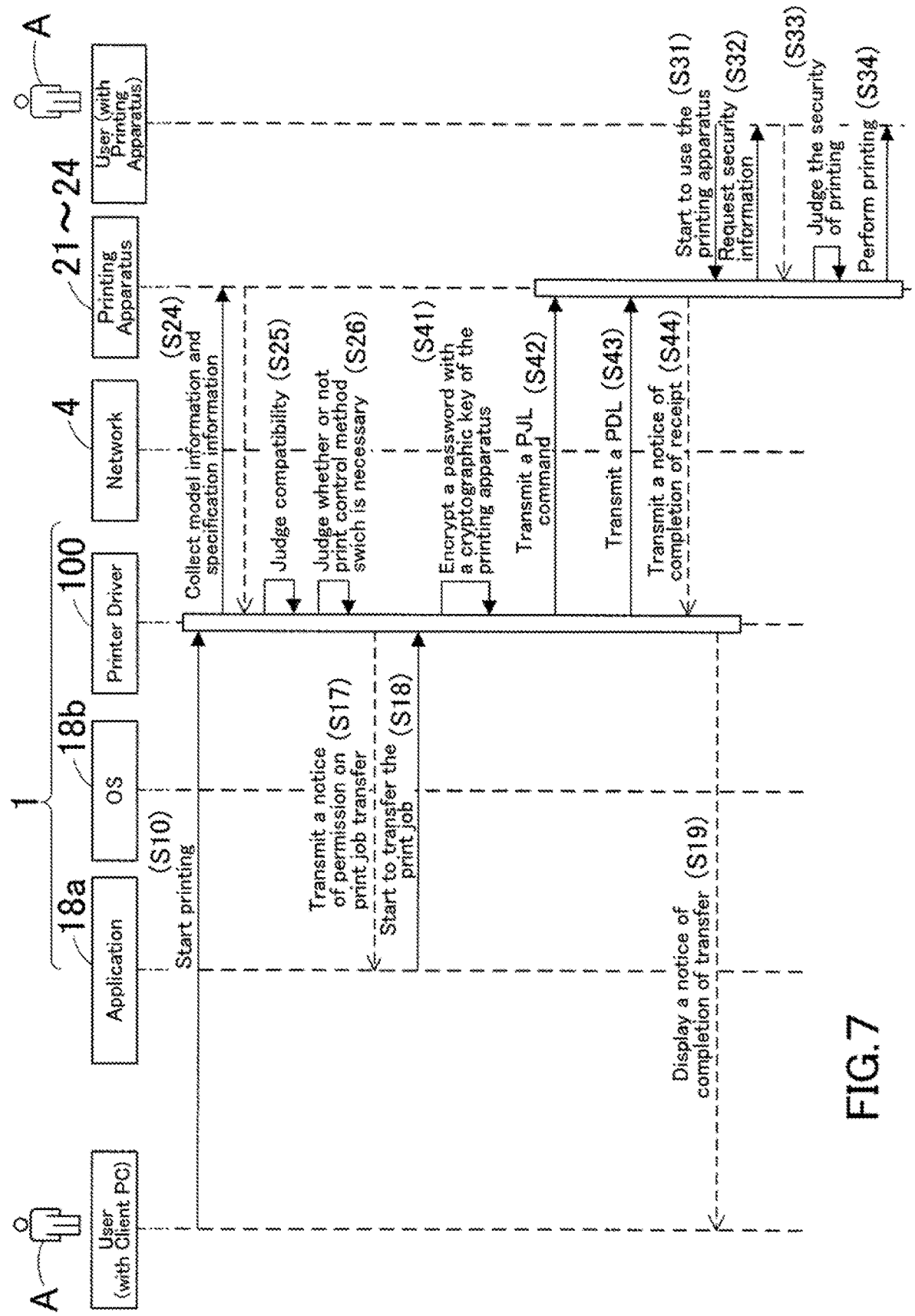
FIG. 7 is a sequence diagram for reference in describing an operation to be performed by the information processing apparatus according to a second embodiment of the present invention.

FIG. 7 is a sequence diagram for reference in describing an operation to be performed by the client PC 1 according to a second embodiment of the present invention. In this embodiment, the client PC 1 and the printing system including the client PC 1 are identical with those in the first embodiment of FIGS. 1 and 2 for their configurations, and the printer driver 100 has additional function.

In this embodiment, as in the first embodiment, the printing apparatus 21 is a printer model supported by the printer driver 100 since it is a printer model from the same manufacturer as that of the printer driver 100. The printing apparatuses 22 and 23 are printer models from the same manufacturer as that of the printer driver 100 but they are only similar printer models to the printer model supported by the printer driver 100. While the printer drive 100 is allowed to support the printing apparatuses 22 and 23, they use different cryptographic keys for secure printing from that of the printer driver 100. In this embodiment, the printer driver 100 stores cryptographic keys used by the printing apparatuses 22 and 23. Furthermore, the printer driver 100 has a function of recognizing the printing apparatuses 22 and 23 as being similar printer models to the printer model supported by the printer driver 100 itself, in addition to the functions described above in the first embodiment.

In this embodiment, User A specifies the printing apparatus 23 for printing, which is similar to the printer model supported by the printer driver 100. The description of the second embodiment will omit Steps S1 to S9 and S21 to S23 because these steps are common with those of FIG. 4A and thus will start with Step S10 of FIG. 7, which corresponds to Step 10 of FIG. 4B. In the step corresponding to Step S9 of FIG. 4A, the printer driver 100 switches the print setting screen for secure printing to an IPP version that is a machine-independent version as in the first embodiment because the printing apparatus 23 is judged to use a different cryptographic key from that of the printer driver 100.

Upon the start of printing by User A in Step S10 of FIG. 7, the printer driver 100 again obtains model information and specification information of the printing apparatus 23 through the network 4 (Step S24). With reference to the model information, the printer driver 100 judges whether or not the printing apparatus 23 is a printer model supported by the printer driver 100 itself (Step S25); with reference to a judgment in Step S25, the printer driver 100 further judges whether or not switching the print control method is necessary (Step S26).

In this embodiment, the printer driver 100 recognizes the printing apparatus 23 as being a similar printer model to the printer model supported by the printer driver 100 itself, and stores a cryptographic key used by the printing apparatus 23.

In this step, the printer driver 100 judges that switching the print control method is not necessary and adopts the cryptographic key of the printing apparatus 23. The printer driver 100 then transmits, to the application 18a, a notice of permission on print job transfer (Step S17). In response to the notice, the application 18a starts to transfer the print job (Step S18). The printer driver 100 encrypts a password and the like with the cryptographic key of the printing apparatus 23 and generates a PJL command (Step S41). The printer driver 100 transmits the PJL command to the printing apparatus 23 (Step S42) and further transmits a PDL including page data of the print job to the printing apparatus 23 (Step S43).

Upon completion of print job receipt, the printing apparatus 23 transmits a notice of completion of print job receipt to the printer driver 100 (Step S44). Upon receipt of this, the printer driver 100 displays a message or icon on the display device 14 of the client PC 1 or on the portable terminal apparatus 3, allowing User A to notice the completion of print job transfer (Step S19).

After that, User A comes to the printing apparatus 23 and starts to use it for printing (Step S31). The printing apparatus 23 requests to enter security information (authentication information) (Step S32). Upon entry of security information by User A, the printing apparatus 23 judges whether or not the entered security information is the same as the encrypted security information included in the print job (Step S33). If it is the same, the printing apparatus 24 performs printing (Step S34).

As described above, in this embodiment, the printer driver 100 recognizes the printing apparatus 23 as being a similar printer model to the printer model supported by the printer driver 100 itself and encrypts a password and the like with the cryptographic key of the printing apparatus 23. So, User A can make the printing apparatus 23 perform secure printing successfully even when the printing apparatus 23 is only similar to the printer model supported by the printer driver 100.

Third Embodiment

Figure 8:
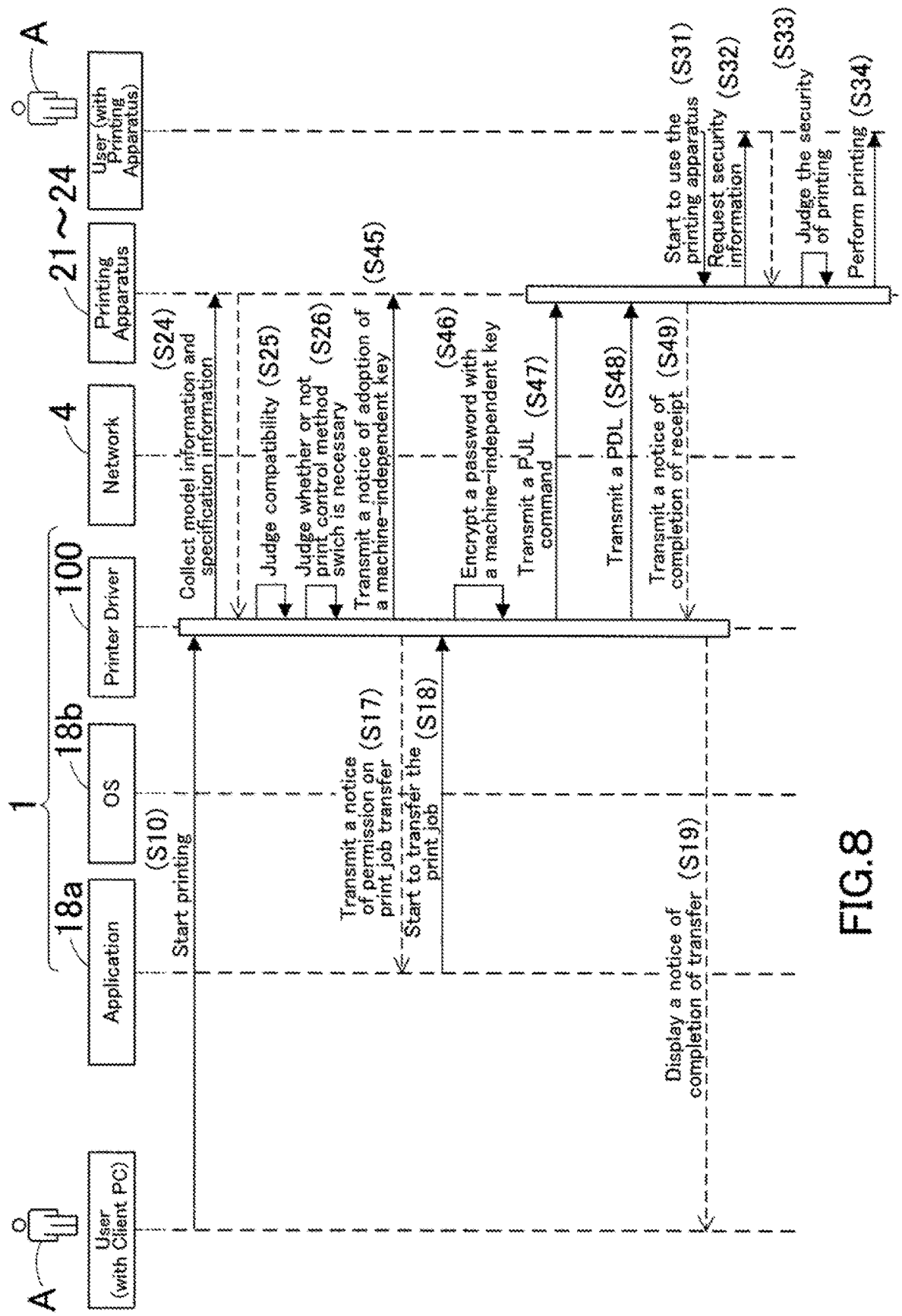
FIG. 8 is a sequence diagram for reference in describing an operation to be performed by the information processing apparatus according to a third embodiment of the present invention.

FIG. 8 is a sequence diagram for reference in describing an operation to be performed by the client PC 1 according to a third embodiment of the present invention. In this embodiment, the client PC 1 and the printing system including the client PC 1 are identical with those in the first embodiment of FIGS. 1 and 2 for their configurations, and the printer driver 100 has additional function.

In this embodiment, as in the first embodiment, the printing apparatus 21 is a printer model supported by the printer driver 100 since it is a printer model from the same manufacturer as that of the printer driver 100. The printing apparatuses 22 and 23 are printer models from the same manufacturer as that of the printer driver 100 but they are only similar printer models to the printer model supported by the printer driver 100. While the printer driver is allowed to support the printing apparatuses 22 and 23, they use different cryptographic keys for secure printing from that of the printer driver 100. In this embodiment, the printer driver 100 does not store cryptographic keys used by the printing apparatuses 22 and 23, unlike the second embodiment. Furthermore, as in the second embodiment, the printer driver 100 has a function of recognizing the printing apparatuses 22 and 23 as being similar printer models to the printer model supported by the printer driver 100 itself, in addition to the functions described above in the first embodiment.

In this embodiment, User A specifies the printing apparatus 23 for printing, which is similar to the printer model supported by the printer driver 100. The description of the third embodiment will omit Steps S1 to S9 and S21 to S23 because these steps are common with those in FIG. 4A and will start with Step S10 of FIG. 7, which corresponds to Step 10 of FIG. 4B. In the step corresponding to Step S9 of FIG. 4A, the printer driver 100 switches the print setting screen for secure printing to an IPP version that is a machine-independent version as in the first embodiment because the printing apparatus 23 is judged to use a different cryptographic key from that of the printer driver 100.

Upon the start of printing by User A in Step S10 of FIG. 8, the printer driver 100 again obtains model information and specification information of the printing apparatus 23 through the network 4 (Step S24). With reference to the model information, the printer driver 100 judges whether or not the printing apparatus 23 is a printer model supported by the printer driver 100 itself (Step S25); with reference to a judgment in Step S25, the printer driver 100 further judges whether or not switching the print control method is necessary (Step S26).

In this embodiment, the printer driver 100 recognizes the printing apparatus 23 as being a similar printer model to the printer model supported by the printer driver 100 itself, but does not store a cryptographic key used by the printing apparatus 23.

In this step, the printer driver 100 adopts the cryptographic key of the printing apparatus 23. The printer driver 100 then transmits a notice of key adoption to the printing apparatus 23 (Step S45).

Subsequently, the printer driver 100 transmits, to the application 18a, a notice of permission on print job transfer (Step S17). In response to the notice, the application 18a starts to transfer the print job (Step S18). The printer driver 100 encrypts a password and the like with a machine-independent cryptographic key and generates a PJL command (Step S46). The printer driver 100 transmits the PJL command to the printing apparatus 23 (Step S47) and further transmits a PDL including page data of the print job to the printing apparatus 23 (Step S48). In other words, the printer driver 100 transmits, to the printing apparatus 23, a PJL command protected by a password encrypted with a machine-independent cryptographic key instead of a PJL command originally generated by the printer driver 100.

Upon completion of print job receipt, the printing apparatus 23 transmits a notice of completion of print job receipt to the printer driver 100 (Step S49). Upon receipt of this, the printer driver 100 displays a message or icon on the display device 14 of the client PC 1 or on the portable terminal apparatus 3, allowing User A to notice the completion of print job transfer (Step S19).

After that, User A comes to the printing apparatus 23 and starts to use it for printing (Step S31). The printing apparatus 23 requests to enter security information (authentication information) (Step S32). Upon entry of security information by User A, the printing apparatus 23 judges whether or not the entered security information is the same as the encrypted security information included in the print job (Step S33). If it is the same, the printing apparatus 24 performs printing (Step S34).

As described above, in this embodiment, the printer driver 100 recognizes the printing apparatus 23 as being a similar printer model to the printer model supported by the printer driver 100 itself and encrypts a password and the like with a machine-independent cryptographic key. So, User A can make the printing apparatus 23 perform secure printing successfully even when the printer driver 100 does not store a cryptographic key of the printing apparatus 23.

Fourth Embodiment

Figure 9:
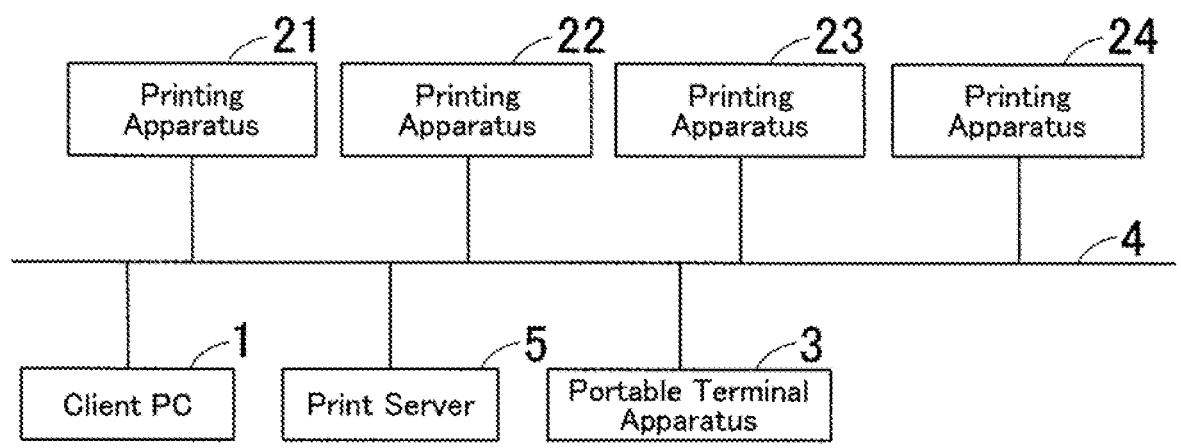
FIG. 9 is a block diagram illustrating another configuration of the printing system.

FIG. 9 is a block diagram illustrating another configuration of the printing system. The printing system includes a print server 5 in addition to the client PC 1, the printing apparatuses 21 to 24, and the portable terminal apparatus 3; these are connected to each other through the network 4.

In this embodiment, the client PC 1 and the portable terminal apparatus 3 are identical with those in the printing system of FIG. 1 for their configurations. Similarly, the printing apparatuses 21 to 24 are identical with those in the printing system of FIG. 1 for their configurations, although their manufacturers are omitted in this figure.

The print server 5 receives print jobs from one or more the client PCs 1 and transfers the print jobs to one of the printing apparatuses 21 to 24, which is specified for printing, or to all the printing apparatuses 21 to 24. The print server 5 is comprised of a personal computer. The description will omit a configuration of the print server 5 because the print server 5 is identical with the client PC 1 of FIG. 2 for its comprehensive configuration.

Figure 10:
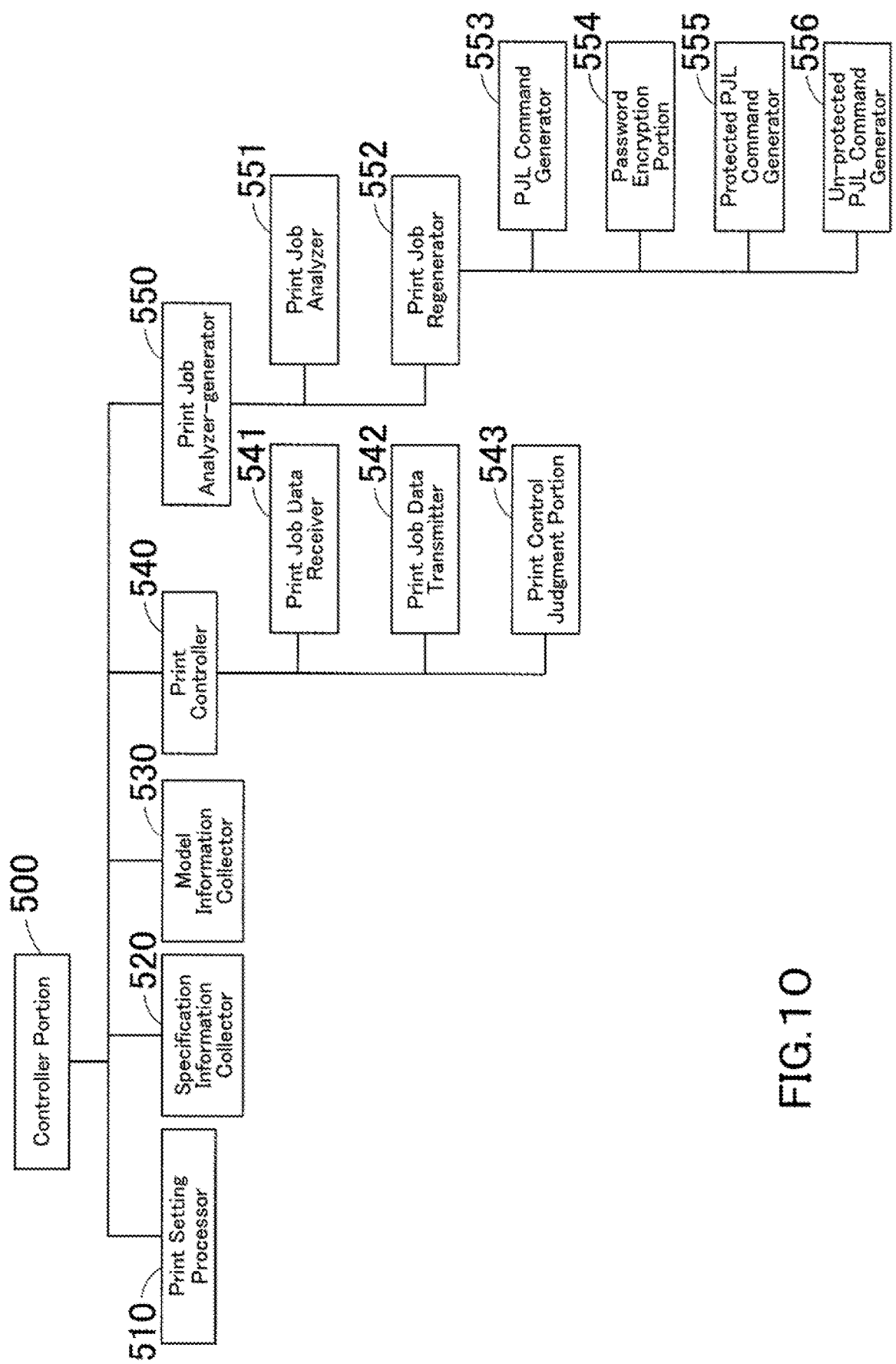
FIG. 10 is a block diagram illustrating a functional configuration of a CPU of a print server, in which the CPU executes functions by running a controller portion including one or more printer drivers.

FIG. 10 is a block diagram illustrating a functional configuration of a CPU of the print server 5, in which the CPU executes functions by running a controller portion 500 including one or more printer drivers.

The controller portion 500 is constituted by: a print setting processor 510; a specification information collector 520; a model information collector 530; a print controller 540; and a print job analyzer-generator 550.

The print setting processor 510 receives a print job from the client PC 1 and performs a process related to settings of the print job.

The specification information collector 520 collects specification information of one or more of the printing apparatuses 21 to 24 through the network 4.

The model information collector 530 collects model information of one or more of the printing apparatuses 21 to 24; model information is manufacturer, brand, and version, for example. With reference to the model information, it will be judged whether or not the printing apparatuses 21 to 24 are printer models supported by a print driver of the print server 5 and whether or not they are printer models from the same manufacturer as that of a printer driver of the print server 5, which are similar to the printer model supported by this printer driver.

The print controller 540 controls transmission and receipt of data of a print job and makes judgments about print control. The print controller 540 is provided with: a print job data receiver 541 that receives data of a print job from an external apparatus such as the portable terminal apparatus 3; a print job data transmitter 542 that transmits data of the print job to a printing apparatus specified for printing; and a print control judgment portion 543. With reference to the model information of the printing apparatuses 21 to 24, which is obtained by the model information collector 530, the print control judgment portion 543 judges whether or not the printing apparatuses 21 to 24 are printer models supported by the printer driver 100 and whether or not they are printer models from the same manufacturer as that of the printer driver 100, which are similar to the printer model supported by the printer driver 100. If they are not printer models supported by the printer driver 100, the print control judgment portion 543 further judges whether or not switching a machine-independent print control method is necessary. If it is necessary, the print control judgment portion 543 switches to an IPP printing method as mentioned above, for example.

The print job analyzer-generator 550 analyzes data of a print job and generates data of a print job; it essentially has a print job analyzer 551 that performs analysis and a print job regenerator 552. The print job regenerator 552 generates and regenerates data of a print job; it is essentially provided with: a PJL command generator 553 that generates a PJL command; a password encrypting portion 554 that encrypts a password with a cryptographic key; a PJL command generator 555 that generates a PJL command protected by the encrypted password; and a PJL command generator 556 that generates a unprotected PJL command.

FIG. 11 is a sequence diagram for reference in describing operations to be performed by the client PC 1 and the print server 5, both being in the printing system of FIG. 9.

In this embodiment and the following embodiments, the client PC 1 transfers a print job mechanically to the print server 5 while User A does not need to specify a printing apparatus for printing.

In this embodiment, the printing apparatuses 21 to 23 are printer models from the same manufacturer as that of the printer driver 100, and the printing apparatus 24 is a printer model from another manufacturer. The printing apparatuses 21 to 23 are printer models supported by the printer driver 100 and the print server 5, and the printing apparatus 24 is a printer model not supported by the printer driver 100 or the print server 5.

User A activates the application 18a using the input device 15 of the client PC 1 (Step S101); the application 18a displays an application screen on the display device 14 (Step S102). User A calls up a print setting screen from the application screen (Step S103). The application 18a then displays a print setting screen (Step S104).

User A calls up a print setting screen for secure printing from the printer driver 100 (Step S105). The printer driver 100 transmits, to the print server 5, a request for model information and specification information of the printing apparatuses 21 to 24 (Step S201). In response to the request, the print server 5 collects model information and specification information of the printing apparatuses 21 to 24 through the network 4 (Step S301) and returns the model information and the specification information to the printer driver 100 of the client PC 1.

With reference to the model information, the printer driver 100 judges whether or not the printing apparatuses 21 to 24 are printer models supported by the printer driver 100 itself (Step S202). At the same time, the printer driver 100 displays the output menu screen D1 of FIG. 5A on the display device 14 (Step S106).

When User A selects "normal printing" in the output menu screen D1 of FIG. 5A, the printer driver 100 will display the print setting screen D2 of FIG. 5B on the display device 14.

User A drops down a drop-down list by clicking on a menu button 14a in the output menu screen D1 and selects "secure printing" from the list (Step S107). As security printing is thus requested by the user, the printer driver 100 judges whether or not the print setting screen for secure printing needs to be switched (Step S203) with reference to a judgment in Step S202 on whether or not the printing apparatuses 21 to 24 are printer models supported by the printer driver 100 itself. If all of them are printer models supported by the printer driver 100 and the print setting screen for secure printing does not need to be switched, the printer driver 100 will display the print setting screen D3 of FIG. 6A.

Not all of the printing apparatus 21 to 24 connected to the network 4 may be printer models supported by the printer driver 100 (in this embodiment, the printing apparatus 24 is not supported). In this case, the printer driver 100 judges that the printing apparatus 24 is not a printer model supported by the printer driver 100 itself and further judges that the print setting screen for secure printing needs to be switched to a machine-independent version such as an IPP version. Subsequently, the printer driver 100 displays a message or icon on the client PC 1, allowing User A to notice that the print setting screen for secure printing will be switched to an IPP version (Step S108) and displays an IPP version of the print setting screen, such as the print setting screen of FIG. 6B, on the display device 14 (Step S109). Such a message or icon may appear in the print setting screen. Alternatively, it may appear on the portable terminal apparatus 3 carried by User A. When there is a change due to the switch, it is preferable that such a change be indicated as shown in the print setting screen D5 of FIG. 6C.

Upon the start of printing by User A (Step S110), the printer driver 100 again transmits, to the print server 5, a request for model information and specification information of the printing apparatuses 21 to 24 (Step S204). In response to the request, the print server 5 collects model information and specification information of the printing apparatuses 21 to 24 through the network 4 (Step S302) and returns the model information and the specification information to the printer driver 100 of the client PC 1.

With reference to the model information, the printer driver 100 judges whether or not the printing apparatuses 21 to 24 are printer models supported by the printer driver 100 itself (Step S205); with reference to a judgment in Step S205, the printer driver 100 further judges whether or not switching the print control method is necessary (Step S206).

Subsequently, the printer driver 100 transmits, to the application 18a, a notice of permission on print job transfer (Step S111). In response to the notice, the application 18a transfers the print job (Step S112).

According to a judgment, the printing apparatus 24 is not a printer model supported by the printer driver 100; and the print control method needs to be switched to an IPP printing method that is a machine-independent print control method. The printer driver 100 encrypts a password with a machine-independent cryptographic key and generates a PJL command protected by the encrypted password (Step S207). The printer driver 100 transmits the PJL command to the print server 5 (Step S208) and further transmits a PDL including page data of the print job to the print server 5 (Step S209). The printer driver 100 may transmit, to the printing apparatuses 21 to 23 supported by the printer driver 100 itself, a PJL command protected with a password encrypted with a machine-independent cryptographic key as well as a PJL command protected by a password encrypted with its own cryptographic key.

Upon completion of print job receipt, the print server 5 transmits a notice of completion of print job receipt to the printer driver 100 (Step S210). Upon receipt of this, the printer driver 100 displays a message or icon on the client PC 1 or the portable terminal apparatus 3, allowing User A to notice the completion of print job transfer (Step S113).

After that, User A comes to the printing apparatus 24 and starts to use it for printing (Step S401). The printing apparatus 24 transmits a request for a print job to the print server 5 (Step S303). In response to the request, the print server 5 obtains model information and specification information of the printing apparatus 24 (Step S304). With reference to the model information, the print server 5 judges whether or not the printing apparatus 24 is a printer model supported by a printer driver of the print server 5 itself (Step S305). The print server 5 further judges whether or not the print control method needs to be switched (Step S306).

According to a judgment, the printing apparatus 24 is not a printer model supported by a printer driver of the print server 5; and the print control method needs to be switched. The print server 5 displays a message or icon on the client PC 1 or on the portable terminal apparatus 3, allowing User A to notice a change due to the switch of print control method (Step S114).

The change due to the switch relates to, for example, at least one of: (i) a downgraded image quality due to the change of image format; (ii) a print function unsupported by a machine-independent print control method; and (iii) a print function unsupported on the specified printing apparatus. With this message or icon, User A can easily notice the change.

User A may reconfigure the settings affected by the change. User A may reconfigure the print settings from the portable terminal apparatus 3; in this case, the portable terminal apparatus 3 transmits a request for print settings change to the print server 5 and the print server 5 receives such a request. Furthermore, User A may change his/her password on record.

After that, the print server 5 decrypts the encrypted password received from the client PC 1 (Step S307), obtains a text string (Step S308), and switches the print control method to a machine-independent print control method (Step S309). The print server 5 transmits attribute information of the print job to the printing apparatus 24 (Step S310) and further transmits page data of the print job to the printing apparatus 24 (Step S311).

The printing apparatus 24 requests User A to enter security information (authentication information) (Step S402). Upon entry of security information by User A, the printing apparatus 24 judges whether or not the entered security information is the same as the encrypted security information included in the print job (Step S403). If it is the same, the printing apparatus 24 performs printing (Step S404).

As described above, in this embodiment, the print server 5 is involved in secure printing. User A can make the printing apparatus 24 perform secure printing successfully from the client PC 1 without concern for the compatibility between the printing apparatus 24, the printer driver 100, and the print server 5. Furthermore, the print server 5 does not need to store multiple printer drivers that support the printing apparatus 21 to 24.

Print settings may migrate from print functions supported by a printer driver of the print server 5 to the corresponding print functions supported by the machine-independent print control method. Furthermore, the print server 5 may process the print data to make it fit to print specifications of the printing apparatus 24, with reference to the specification information of the printing apparatus 24. For example, the print server 5 may downgrade the image quality depending on the resolution of the printing apparatus 24; the print server 5 may convert the print data into a file format supported on the printing apparatus 24 when the file format specified by the user is not supported on the printing apparatus 24.

Fifth Embodiment

Figure 12:
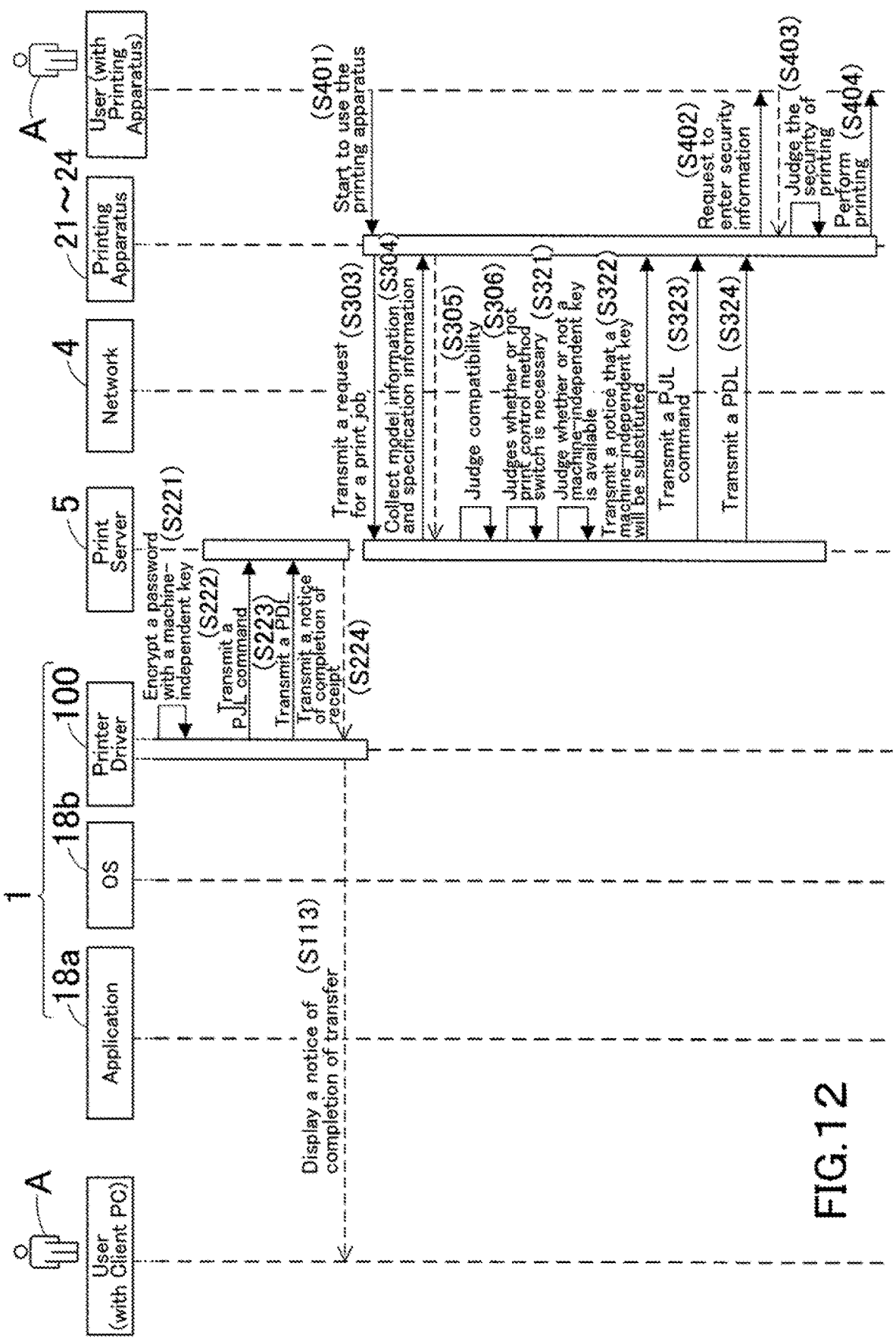
FIG. 12 is a sequence diagram for reference in describing operations to be performed by the information processing apparatus and the print server according to a fifth embodiment of the present invention.

FIG. 12 is a sequence diagram for reference in describing operations to be performed by the client PC 1 and the print server 5 according to a fifth embodiment of the present invention. In this embodiment, the printing apparatuses 21 to 24 are printer models from the same manufacturer as that of the printer driver 100 but they are only similar printer models to the printer model supported by the printer driver 100. While the printer driver 100 is allowed to support the printing apparatuses 21 to 24, they use different cryptographic keys for secure printing from that of the printer driver 100. In this embodiment, the printer driver 100 does not store cryptographic keys used by the printing apparatuses 22 to 24. Furthermore, as in the second embodiment, the printer driver 100 has a function of recognizing the printing apparatuses 21 to 24 as being similar printer models to the printer model supported by the printer driver 100 itself, in addition to the functions described above in the first embodiment.

Similarly, while the print server 5 is allowed to support the printing apparatuses 21 to 24, they use different cryptographic keys for secure printing from that of the print server 5; and the print server 5 does not store the cryptographic keys used by the printing apparatuses 22 to 24. Furthermore, as in the fourth embodiment, the print server 5 has a function of recognizing the printing apparatuses 21 to 24 as being similar printer models to the printer model supported by the print server 5 itself.

Figure 11A:
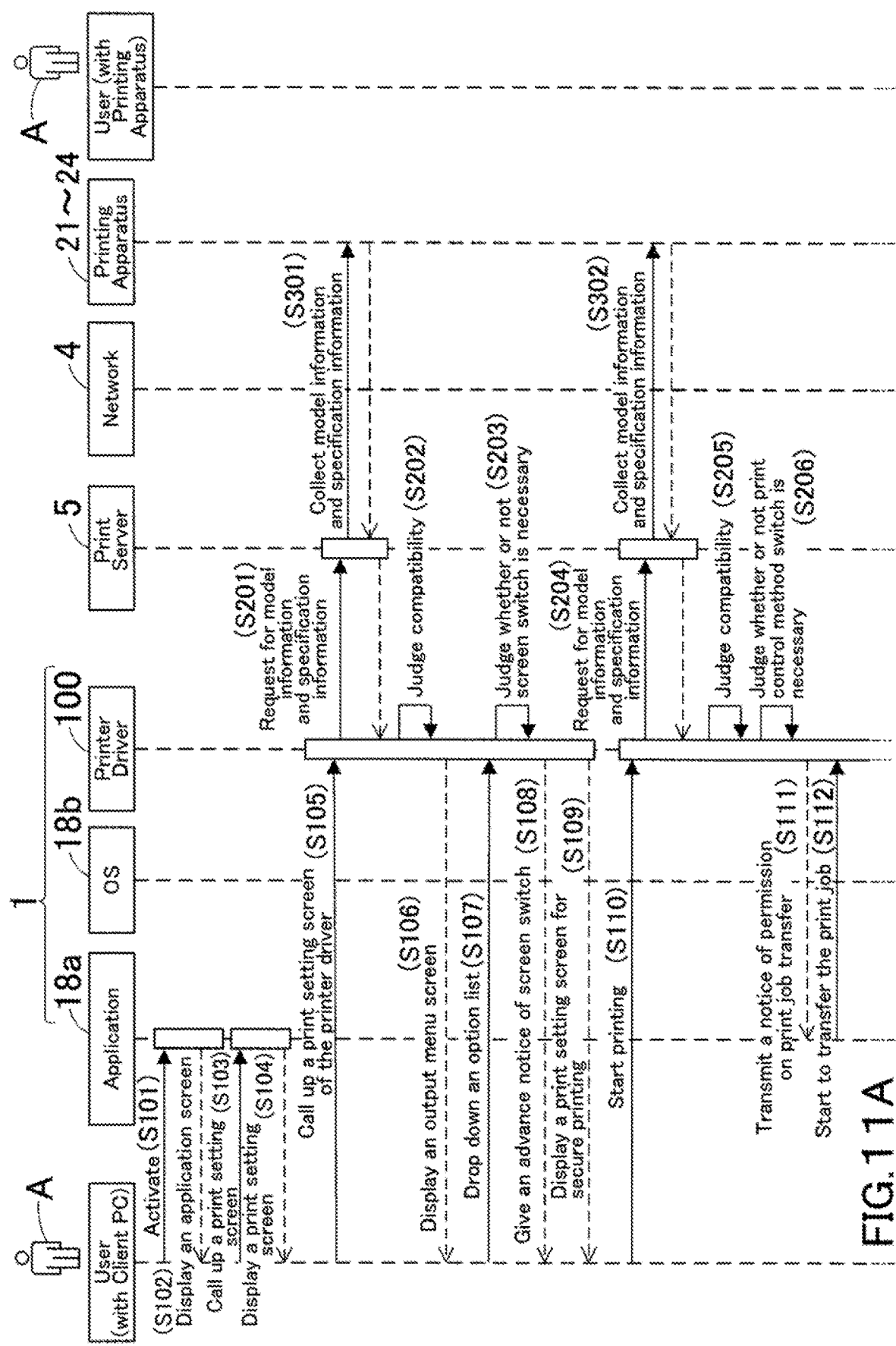
FIG. 11A is a sequence diagram for reference in describing operations to be performed by the information processing apparatus and the print server, both being in the printing system of FIG. 9, according to a fourth embodiment of the present invention.
Figure 11B:
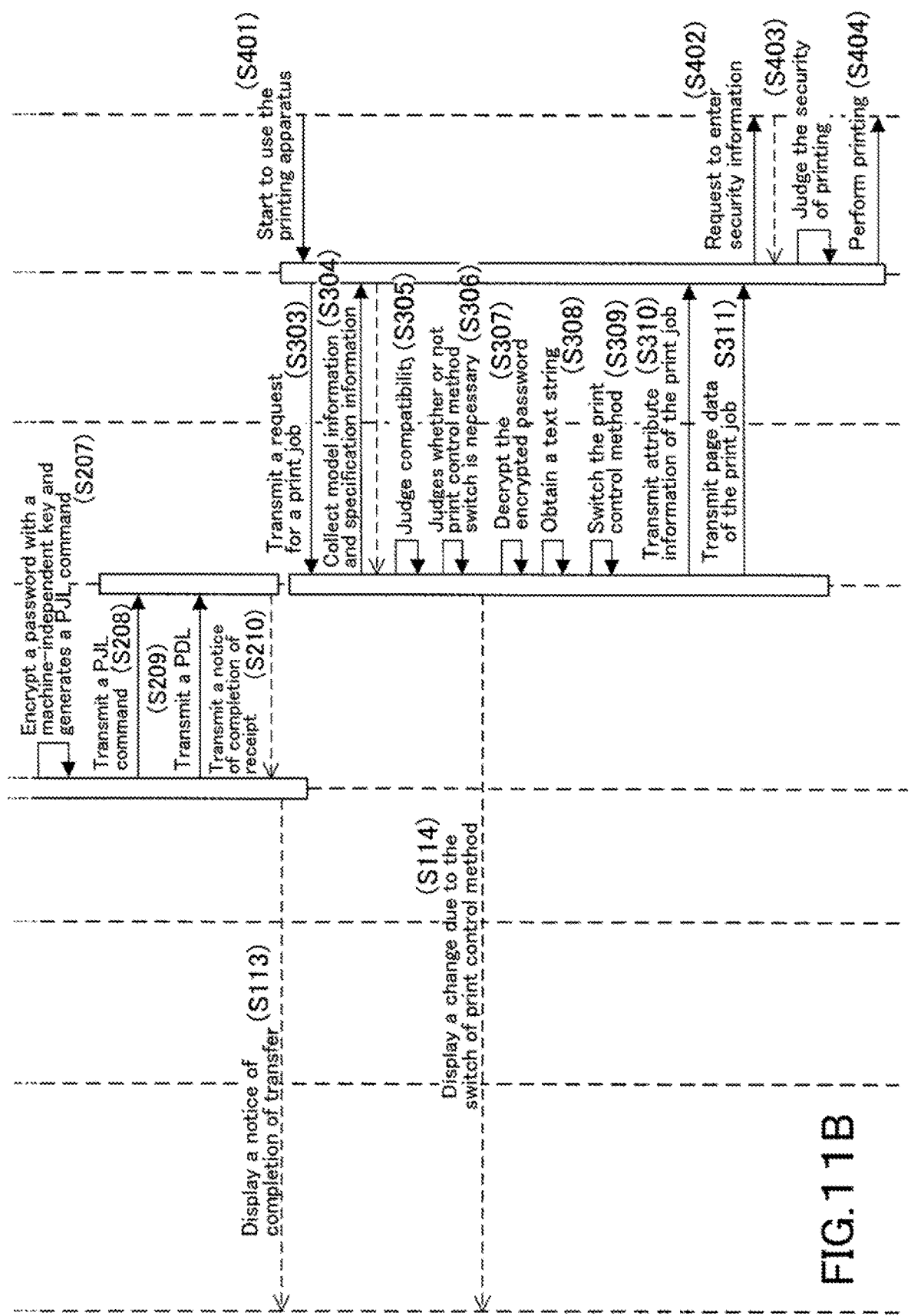
FIG. 11B is a sequence diagram continued from FIG. 11A.

The description of the fifth embodiment will omit Steps S101 to S112, S201 to S206, S301, and S302 because these steps are common with those of FIG. 11A and thus will start with Step S221 of FIG. 12, which corresponds to Step 207 of FIG. 11B.

According to a judgment in Step S206 of FIG. 11A, the printing apparatuses 21 to 24 are similar to the printer model supported by the printer driver 100 and use different cryptographic keys from that of the printer driver 100. Since the printer driver 100 does not store cryptographic keys of the printing apparatuses 21 to 24, the printer driver 100 encrypts a password with a machine-independent cryptographic key and generates a PJL command (Step S221). The printer driver 100 transmits the PJL command to the print server 5 (Step S222) and further transmits a PDL including page data of the print job to the print server 5 (Step S223). In other words, the printer driver 100 transmits, to the print server 5, a PJL command protected by a password encrypted with a machine-independent cryptographic key instead of a PJL command originally generated by the printer driver 100.

Upon completion of print job receipt, the print server 5 transmits a notice of completion of print job receipt to the printer driver 100 (Step S224). Upon receipt of this, the printer driver 100 displays a message or icon on the client PC 1 or the portable terminal apparatus 3, allowing User A to notice the completion of print job transfer (Step S113).

After that, User A comes to the printing apparatus 22, for example, and starts to use it for printing (Step S401). The printing apparatus 22 transmits a request for a print job to the print server 5 (Step S303). In response to the request, the print server 5 obtains model information and specification information of the printing apparatus 22 (Step S304). With reference to the model information, the print server 5 judges whether or not the printing apparatus 22 is a printer model supported by a printer driver of the print server 5 itself (Step S305). With reference to a judgment in Step S305, the print server 5 judges whether or not the print control method needs to be switched (Step S306). The print server 5 further judges whether or not a machine-independent cryptographic key is available (Step S321). Since it is available in this embodiment, the print server 5 transmits, to the printing apparatus 22, a notice that a machine-independent cryptographic key will be substituted (Step S322). The print server 5 transmits the PJL command to the printing apparatus 22 (Step S323) and further transmits a PDL including page data of the print job to the printing apparatus 22 (Step S324).

The printing apparatus 22 requests User A to enter security information (authentication information) (Step S402). Upon entry of security information by User A, the printing apparatus 22 judges whether or not the entered security information is the same as the encrypted security information included in the print job (Step S403). If it is the same, the printing apparatus 22 performs printing (Step S404).

As described above, in this embodiment, the printer driver 100 recognizes the printing apparatus 22 as being a similar printer model to the print model supported by the printer driver 100 itself and encrypts a password and the like with a machine-independent cryptographic key. So, User A can make the printing apparatus 22 perform secure printing successfully even when the print server 5 does not store a cryptographic key of the printing apparatus 22.

Sixth Embodiment

Figure 13:
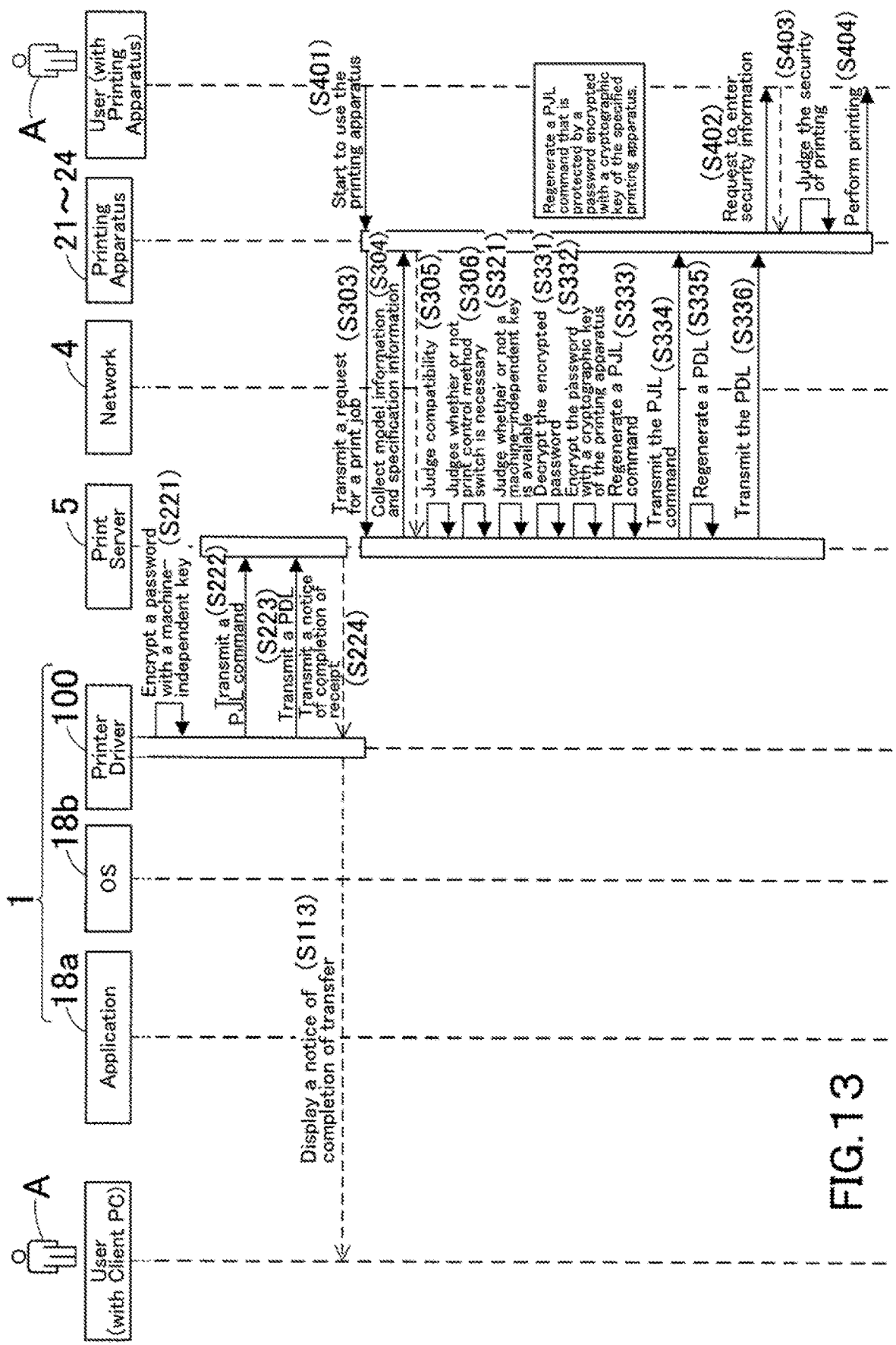
FIG. 13 is a sequence diagram for reference in describing operations to be performed by the information processing apparatus and the print server according to a sixth embodiment of the present invention.

FIG. 13 is a sequence diagram for reference in describing operations to be performed by the client PC 1 and the print server 5 according to a sixth embodiment of the present invention. In this embodiment, the printing apparatuses 21 to 24 are printer models from the same manufacturer as that of the printer driver 100 but they are only similar printer models to the printer model supported by the printer driver 100. While the printer driver 100 is allowed to support the printing apparatuses 21 to 24, they use different cryptographic keys for secure printing from that of the printer driver 100. As in the fifth embodiment, the printer driver 100 does not store cryptographic keys used by the printing apparatuses 22 to 24. Furthermore, as in the second embodiment, the printer driver 100 has a function of recognizing the printing apparatuses 21 to 24 as being similar printer models to the printer model supported by the printer driver 100 itself, in addition to the functions described above in the first embodiment.

Meanwhile, the print server 5 is allowed to support the printing apparatuses 21 to 24 and stores cryptographic keys used by them.

The description of the sixth embodiment will omit Steps S101 to S112, S201 to S206, S301, and S302 because these steps are common with those of FIG. 11A and thus will start with Step S221 of FIG. 13, which corresponds to Step 207 of FIG. 11B.

According to a judgment in Step S206 of FIG. 11A, the printing apparatuses 21 to 24 are similar printer models to the printer model supported by the printer driver 100 and use different cryptographic keys from that of the printer driver 100. Since the printer driver 100 does not store cryptographic keys of the printing apparatuses 21 to 24, the printer driver 100 encrypts a password with a machine-independent cryptographic key and generates a PJL command protected by the encrypted password (Step S221). The printer driver 100 transmits the PJL command to the print server 5 (Step S222) and further transmits a PDL including page data of the print job to the print server 5 (Step S223). In other words, the printer driver 100 transmits, to the print server 5, a PJL command protected by a password encrypted with a machine-independent cryptographic key instead of a PJL command originally generated by the printer driver 100.

Upon completion of print job receipt, the print server 5 transmits a notice of completion of print job receipt to the printer driver 100 (Step S224). Upon receipt of this, the printer driver 100 displays a message or icon on the client PC 1 or the portable terminal apparatus 3, allowing User A to notice the completion of print job transfer (Step S113).

After that, User A comes to the printing apparatus 22, for example, and starts to use it for printing (Step S401). The printing apparatus 22 transmits a request for a print job to the print server 5 (Step S303). In response to the request, the print server 5 obtains model information and specification information of the printing apparatus 22 (Step S304). With reference to the model information, the print server 5 judges whether or not the printing apparatus 22 is a printer model supported by a printer driver of the print server 5 itself (Step S305). With reference to a judgment in Step S305, the print server 5 judges whether or not the print control method needs to be switched (Step S306). The print server 5 further judges whether or not a machine-independent cryptographic key is available (Step S321).

Since the print server 5 supports the printing apparatus 22 in this embodiment, the print server 5 decrypts the encrypted password with a machine-independent cryptographic key received from the client PC 1 (Step S331) and encrypts the password with a cryptographic key of the printing apparatus 22 (Step S332). The print server 5 regenerates a PJL command that is protected by the password encrypted with the cryptographic key of the printing apparatus 22 (Step S333).

Subsequently, the printer driver 100 transmits the regenerated PJL command to the printing apparatus 22 (Step S334), regenerates a PDL including page data of the print job (Step S335), and transmits the PDL to the printing apparatus 22 (Step S336).

The printing apparatus 22 requests User A to enter security information (authentication information) (Step S402). Upon entry of security information by User A, the printing apparatus 22 judges whether or not the entered security information is the same as the encrypted security information included in the print job (Step S403). If it is the same, the printing apparatus 22 performs printing (Step S404).

As described above, in this embodiment, the print server 5 is allowed to support the printing apparatuses 21 to 24. So, User A can make any of the printing apparatuses 21 to 24 perform secure printing successfully from the client PC 1 even when the printing apparatus 22 is not a printer model supported by the printer driver 100.

Seventh Embodiment

Figure 14:
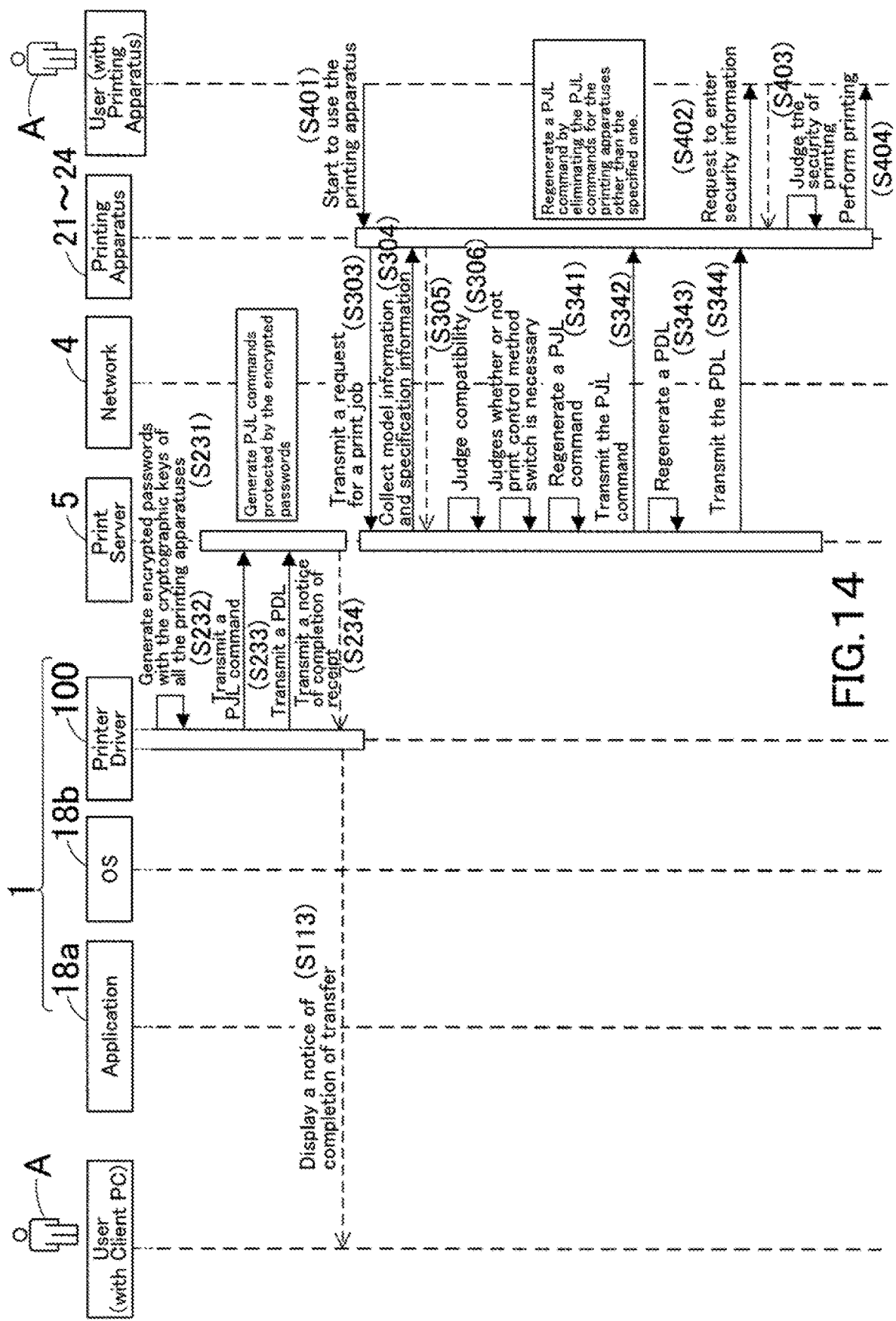
FIG. 14 is a sequence diagram for reference in describing operations to be performed by the information processing apparatus and the print server according to a seventh embodiment of the present invention.

FIG. 14 is a sequence diagram for reference in describing operations to be performed by the client PC 1 and the print server 5 according to a seventh embodiment of the present invention.

In this embodiment, the printing apparatuses 21 to 24 are printer models from the same manufacturer as that of the printer driver 100 of the client PC 1 but they are only similar printer models to the printer model supported by the printer driver 100. While the printer driver 100 is allowed to support the printing apparatuses 21 to 24, they use different cryptographic keys for secure printing from that of the printer driver 100. In this embodiment, the printer driver 100 store cryptographic keys used by the printing apparatuses 21 to 24. Furthermore, the printer driver 100 has a function of recognizing the printing apparatuses 21 to 24 as being similar printer models to the printer model supported by the printer driver 100 itself.

As in the case with the printer driver 100, while the print server 5 is allowed to support the printing apparatuses 21 to 24, they use different cryptographic keys for secure printing from that of the print server 5. Unlike the printer driver 100, the print server 5 does not store cryptographic keys used by the printing apparatuses 21 to 24. Furthermore, the print server 5 has a function of recognizing the printing apparatuses 21 to 24 as being similar printer models to the printer model supported by the print server 5 itself.

The description of the seventh embodiment will omit Steps S101 to S112, S201 to S206, S301, and S302 because these steps are common with those of FIG. 11A and thus will start with Step S231 of FIG. 14, which corresponds to Step 207 of FIG. 11B.

According to a judgment, the printing apparatuses 21 to 24 are similar printer models to the printer model supported by the printer driver 100. Since the printer driver 100 stores cryptographic keys of the printing apparatuses 21 to 24, the printer driver 100 generates encrypted passwords by encrypting a password with each of the cryptographic keys and generates PJL commands protected by the encrypted passwords (Step S231). The printer driver 100 transmits all the PJL commands to the print server 5 (Step S232) and further transmits a PDL including page data of the print job to the print server 5 (Step S233).

Upon completion of print job receipt, the print server 5 transmits a notice of completion of print job receipt to the printer driver 100 (Step S234). Upon receipt of this, the printer driver 100 displays a message or icon on the client PC 1 or the portable terminal apparatus 3, allowing User A to notice the completion of print job transfer (Step S113).

After that, User A comes to the printing apparatus 24, for example, and starts to use it for printing (Step S401). The printing apparatus 24 transmits a request for a print job to the print server 5 (Step S303). In response to the request, the print server 5 obtains model information and specification information of the printing apparatus 24 (Step S304). With reference to the model information, the print server 5 judges whether or not the printing apparatus 24 is a printer model supported by a printer driver of the print server 5 itself (Step S305). The print server 5 further judges whether or not the print control method needs to be switched (Step S306).

The print server 5 receives, from client PC 1, the PJL commands for the printing apparatuses 21 to 24, protected by the encrypted passwords. The print server 5 regenerates a PJL command by eliminating the PJL commands for the printing apparatuses 21 to 23 (Step S341). Subsequently, the print server 5 transmits the regenerated PJL command to the printing apparatus 24 (Step S342), regenerates a PDL including page data of the print job (Step S343), and transmits the PDL to the printing apparatus 24 (Step S344).

The printing apparatus 24 requests User A to enter security information (authentication information) (Step S402). Upon entry of security information by User A, the printing apparatus 22 judges whether or not the entered security information is the same as the encrypted security information included in the print job (Step S403). If it is the same, the printing apparatus 22 performs printing (Step S404).

As described above, in this embodiment, the printer driver 100 stores cryptographic keys of the printing apparatuses 21 to 24. So, User A can make any of the printing apparatuses 21 to 24 perform secure printing successfully from the client PC 1 even when the print server 5 does not store cryptographic keys of the printing apparatuses 21 to 24.

Eighth Embodiment

Figure 15:
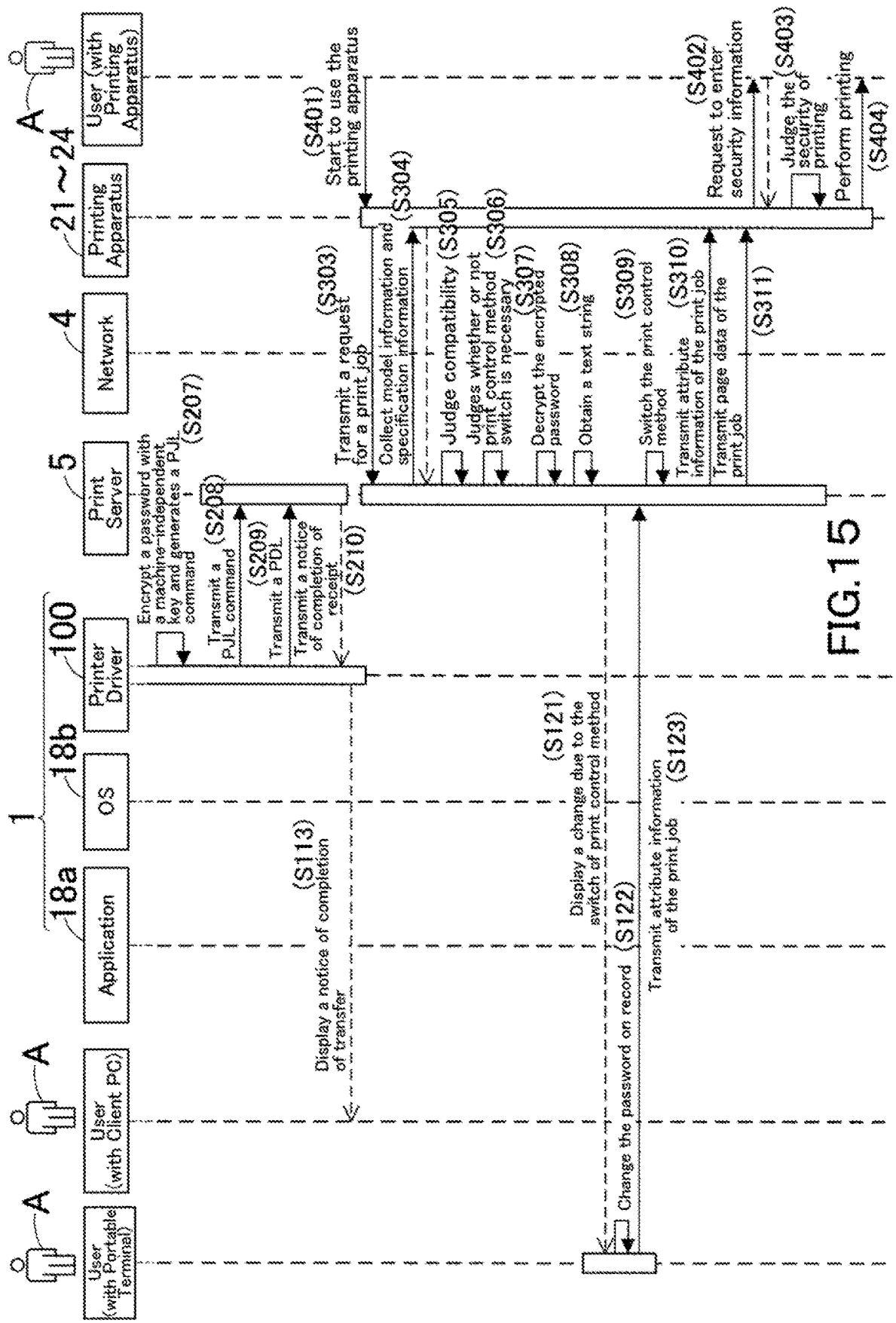
FIG. 15 is a sequence diagram for reference in describing operations to be performed by the information processing apparatus and the print server according to an eighth embodiment of the present invention.

FIG. 15 is a sequence diagram for reference in describing operations to be performed by the client PC 1 and the print server 5 according to an eighth embodiment of the present invention.

In this embodiment, the print server 5 is configured to transmit a notice of a change due to the switch to the portable terminal apparatus 3 carried by User A upon switching the print control method to a machine-independent print control method.

In this embodiment, the client PC 1, the print server 5, and the printing apparatuses 21 to 24 are identical with those in the fourth embodiment of FIGS. 11A and 11B for their configurations. The description of the eighth embodiment will omit Steps S101 to S113, S201 to 210, S301, and S302 because these steps are common with those in FIGS. 11A and 11B and thus will start with Step S401 of FIG. 15.

User A comes to the printing apparatus 24, for example, and starts to use it for printing (Step S401). The printing apparatus 24 transmits a request for a print job to the print server 5 (Step S303). In response to the request, the print server 5 obtains model information and specification information of the printing apparatus 24 (Step S304). With reference to the model information, the print server 5 judges whether or not the printing apparatus 24 is a printer model supported by a printer driver of the print server 5 itself (Step S305). The print server 5 further judges whether or not the print control method needs to be switched (Step S306).

According to a judgment, the printing apparatus 24 is not a printer model supported by a printer driver of the print server 5; and the print control method needs to be switched. The print server 5 decrypts the encrypted password received from the client PC 1 (Step S307) and obtains a text string (Step S308).

Subsequently, the print server 5 displays a message or icon on the portable terminal apparatus 3, allowing User A to notice a change due to the switch of print control method (Step S121). The change due to the switch relates to, for example, at least one of: (i) a downgraded image quality due to the change of image format; (ii) a print function unsupported by a machine-independent print control method; and (iii) a print function unsupported on the specified printing apparatus.

User A changes his/her password on record via a password setting screen displayed on the portable terminal apparatus 3 (Step S122), and the portable terminal apparatus 3 transmits attribute information of the print job to the print server 5 (Step S123). Furthermore, User A may reconfigure the print settings as necessary via a print setting screen displayed on the portable terminal apparatus 3.

Receiving attribute information of the print job from the portable terminal apparatus 3, the print server 5 switches the print control method to a machine-independent print control method (Step S309). The print server 5 then transmits attribute information of the print job to the printing apparatus 24 (Step S310). The print server 5 further transmits page data of the print job to the printing apparatus 24 (Step S311).

The printing apparatus 24 requests User A to enter security information (authentication information) (Step S402). Upon entry of security information by User A, the printing apparatus 22 judges whether or not the entered security information is the same as the encrypted security information included in the print job (Step S403). If it is the same, the printing apparatus 22 performs printing (Step S404).

As described above, in this embodiment, when the print server 5 switches to the print control method to a machine-independent print control method, the print server 5 allows User A to notice a change due to the switch via the portable terminal apparatus 3. So, User A can change his/her password on record from the portable terminal apparatus 3, which would make printing experiences user-friendly.

While some embodiments of the present invention have been described in detail herein, it should be understood that the present invention is not limited to these embodiments.

For example, the printer driver 100 of the client PC 1 and the print server 5 are configured to collect model information and specification information of the printing apparatuses 21 to 24, directly from the printing apparatuses 21 to 24. The printer driver 100 and the print server 5 may be further configured to store the model information and the specification information on the memory 13 or an external database server as reference information and, when necessary, retrieve the reference information from the memory 13 or the external database server; in this case, with reference to the reference information, the printer driver 100 and the print server 5 judge whether or not the printing apparatuses 21 to 24 are printer models supported by the printer driver 100 and the print server 5, and further judge whether or not the print control method needs to be switched to a machine-independent print control method.

Furthermore, the client PC 1 and the print server 5 may be configured to store and manage the following information related to compatibility: the printing apparatuses 21 to 24; printer models supported by the printer driver 100; and printer models supported by the print server 5. The client PC 1 and the print server 5 may be further configured to store and manage: names of the printer driver 100; print commands of the print setting software; name of a machine-independent print control method; and control commands of the machine-independent print control method, while a least one of them is linked to the information related to compatibility.

A change due to the switch of print control method may be related to at least one of: (i) a preference related to secure printing, such as cryptographic key, cryptographic method, allowed number of characters for a password, and allowed type of characters for a password; (ii) a paper feed or paper-related preference that is machine-dependent, such as paper tray, paper size, and paper type; (iii) a page-related preference that is machine-dependent, such as chapter brakes and blank page prevention; and (iiii) an image format preference that is machine-dependent. The print control method may be switched to a machine-independent print control method when at least one of the aforementioned preferences is unsupported on a printing apparatus specified for printing.

Although one or more embodiments of the present invention have been described and illustrated in detail, the disclosed embodiments are made for purposes of illustration and example only and not limitation. The scope of the present invention should be interpreted by terms of the appended claims

What is claimed is:

1. An information processing apparatus comprising a processor that performs:
    after a user starts to configure settings for printing, making a first judgment on whether or not a printing apparatus specified for printing is a printer model supported by print setting software installed on the information processing apparatus;
    making a second judgment on whether or not switching to a machine-independent print control method is necessary, with reference to the first judgment; and
    when switching to a machine-independent print control method is necessary, performing: switching to the machine-independent print control method; generating a first print job by the machine-independent print control method; and transmitting the first print job to the specified printing apparatus.

2. The information processing apparatus according to claim 1, wherein switching to the machine-independent print control method includes changing a print command.

3. The information processing apparatus according to claim 1, wherein, upon switching to the machine-independent print control method, the processor allows the user to notice a change due to the switch.

4. The information processing apparatus according to claim 3, wherein the processor allows the user to notice at least one of: (i) a downgraded image quality due to a change of image format; (ii) a print function unsupported by the machine-independent print control method; and (iii) a print function unsupported on the specified printing apparatus.

5. The information processing apparatus according to claim 3, wherein the processor allows the user to notice the change via a portable terminal apparatus carried by the user, and the processor is capable of receiving a request to change the settings for printing, from the portable terminal apparatus.

6. The information processing apparatus according to claim 1, wherein, upon switching to the machine-independent print control method, the processor performs: switching a print setting screen to a machine-independent version, the print setting screen being displayed on a display; and allowing the user to notice that the print setting screen has been switched.

7. The information processing apparatus according to claim 1, wherein the settings for printing by the user are settings for secure printing using authentication information.

8. The information processing apparatus according to claim 7,
wherein the processor further displays an option menu screen that allows the user to select secure printing using authentication information, and
wherein the processor makes the second judgment when the user selects secure printing using authentication information.

9. The information processing apparatus according to claim 1, wherein the settings for printing by the user are settings for secure printing using a cryptographic key.

10. The information processing apparatus according to claim 1,
wherein the specified printing apparatus is connected to the information processing apparatus through a network, and
wherein, when the specified printing apparatus is not a printer model supported by the print setting software, the specified printing apparatus being connected to the information apparatus through the network, the processor judges that switching to the machine-independent print control method is necessary.

11. The information processing apparatus according to claim 1, wherein the processor makes the settings for printing migrate from a first print function to a second print function, the first print function being supported by the print setting software, the second print function being supported by the machine-independent print control method, the second print function corresponding to the first print function.

12. The information processing apparatus according to claim 1, wherein, upon switching to the machine-independent print control method, the processor processes print data depending on print specifications of the specified printing apparatus.

13. The information processing apparatus according to claim 1, further comprising a storage that stores, as reference information, specification information and model information of one or more the specified printing apparatuses, the storage being inside or outside of the information processing apparatus, wherein the processor makes the first judgment with reference to the reference information stored on the storage, and makes the second judgment with reference to the first judgment.

14. The information processing apparatus according to claim 1, wherein the processor is capable of recognizing the specified printing apparatus as being a similar printer model to a printer model supported by the print setting software, the similar printer model being made by the same manufacturer as that of the print setting software.

15. The information processing apparatus according to claim 14, wherein, upon recognizing the specified printing apparatus as being the similar printer model made by the same manufacturer as that of the print setting software, the processor generates the first print job by changing a printer command or adding another print command.

16. The information processing apparatus according to claim 15, wherein, when the print setting software and the specified printing apparatus use different cryptographic keys for secure printing using authentication information, the processor generates a first print command or a second print command, the first print command being protected by authentication information encrypted with the cryptographic key of the specified printing apparatus, the second print command being protected by authentication information encrypted with a machine-independent cryptographic key.

17. The information processing apparatus according to claim 1, wherein the processor further performs:
managing compatibility information related to the specified printing apparatus and the printer model supported by the print setting software; and
managing at least one of: names of functions of the print setting software; print commands of the print setting software; name of the machine-independent print control method; and control commands of the machine-independent print control method, the at least one of them being linked to the compatibility information.

18. The information processing apparatus according to claim 1, wherein a change due to the switch may be related to at least one of: a preference related to secure printing using authentication information; a paper feed or paper-related preference; a page-related preference; and an image format preference.

19. The information processing apparatus according to claim 1, wherein the print setting software is a printer driver.

20. The information processing apparatus according to claim 1, wherein printing by the machine-independent print control method is IPP printing.

21. A print server configured to receive a first print job from one or more information processing apparatuses and transfer the first print job to a printing apparatus specified for printing, the print server comprising a processor that performs:
after a user starts to configure settings for printing, making a first judgment on whether or not the specified printing apparatus is a printer model supported by print setting software installed on the information processing apparatus;
making a second judgment on whether or not switching to a machine-independent print control method is necessary, with reference to the first judgment; and
when switching to a machine-independent print control method is necessary, performing: switching to the machine-independent print control method; generating a second print job by the machine-independent print control method; and transmitting the second print job to the specified printing apparatus.

22. The print server according to claim 21, wherein switching to the machine-independent print control method includes changing a print command.

23. The print server according to claim 21, wherein, upon switching to the machine-independent print control method, the processor allows the user to notice a change due to the switch.

24. The print server according to claim 23, wherein the processor allows the user to notice at least one of: (i) a downgraded image quality due to a change of image format; (ii) a print function unsupported by the machine-independent print control method; and (iii) a print function unsupported on the specified printing apparatus.

25. The print server according to claim 23, wherein the processor allows the user to notice the change via a portable terminal apparatus carried by the user, and the processor is capable of receiving a request to change the settings for printing, from the portable terminal apparatus.

26. The print server according to claim 21, wherein the second print job generated by the processor is a print job for secure printing using authentication information.

27. The print server according to claim 21, wherein the second print job generated by the processor is a print job for secure printing using a cryptographic key.

28. The print server according to claim 21,
wherein the specified printing apparatus is connected to the information processing apparatus through a network, and
wherein, when the specified printing apparatus is not a printer model supported by the print setting software, the specified printing apparatus being connected to the information apparatus through the network, the processor judges that switching to the machine-independent print control method is necessary.

29. The print server according to claim 21, wherein the processor makes the settings for printing migrate from a first print function to a second print function, the first print function being supported by the print setting software, the second print function being supported by the machine-independent print control method, the second print function corresponding to the first print function.

30. The print server according to claim 21, wherein, upon switching to the machine-independent print control method, the processor processes print data depending on print specifications of the specified printing apparatus.

31. The print server according to claim 21, further comprising a storage that stores, as reference information, specification information and model information of one or more the specified printing apparatuses, the storage being inside or outside of the print server, wherein the processor makes the first judgment with reference to the reference information stored on the storage, and makes the second judgment with reference to the first judgment.

32. The print server according to claim 21,
the processor is capable of recognizing the specified printing apparatus as being a similar printer model to a printer model supported by the print setting software, the similar printer model being made by the same manufacturer as that of the print setting software.

33. The print server according to claim 32, wherein, upon recognizing the specified printing apparatus as being the similar printer model made by the same manufacturer as that of the print setting software, the processor generates the second print job by changing a printer command or adding another print command.

34. The print server according to claim 33, wherein, when the print setting software and the specified printing apparatus use different cryptographic keys for secure printing using authentication information, the processor generates a first print command or a second print command, the first print command being protected by authentication information encrypted with the cryptographic key of the specified printing apparatus, the second print command being protected by authentication information encrypted with a machine-independent cryptographic key.

35. The print server according to claim 21, wherein the processor further performs:
managing compatibility information related to the specified printing apparatus and the printer model supported by the print setting software; and
managing at least one of: names of functions of the print setting software; print commands of the print setting software; name of the machine-independent print control method; and control commands of the machine-independent print control method, the at least one of them being linked to the compatibility information.

36. The print server according to claim 21, wherein a change due to the switch may be related to at least one of: a preference related to printing using authentication information; a paper feed or paper-related preference; a page-related preference; and an image format preference.

37. The print server according to claim 21, wherein the print setting software is a printer driver.

38. The print server according to claim 21, wherein printing by the machine-independent print control method is IPP printing.

39. A non-transitory computer-readable recording medium storing a program for a computer of an information processing apparatus to execute:
after a user starts to configure settings for printing, making a first judgment on whether or not a printing apparatus specified for printing is a printer model supported by print setting software installed on the computer;
making a second judgment on whether or not switching to a machine-independent print control method is necessary, with reference to the first judgment; and
when switching to a machine-independent print control method is necessary, performing: switching to the machine-independent print control method; generating a print job by the machine-independent print control method; and transmitting the print job to the specified printing apparatus.

40. A non-transitory computer-readable recording medium storing a program for a computer of a print server, the print server to receive a first print job from one or more information processing apparatuses and transfer the first print job to a printing apparatus specified for printing, the program for the computer to execute:
after a user starts to configure settings for printing, making a first judgment on whether or not the specified printing apparatus is a printer model supported by print setting software installed on the computer;
making a second judgment on whether or not switching to a machine-independent print control method is necessary, with reference to the first judgment; and
when switching to a machine-independent print control method is necessary, performing: switching to the machine-independent print control method; generating a second print job by the machine-independent print control method; and transmitting the second print job to the specified printing apparatus.

* * * * *